United States Patent
Wacker et al.

(10) Patent No.: US 12,163,683 B2
(45) Date of Patent: Dec. 10, 2024

(54) SYSTEM FOR AUTO-ADJUSTMENT OF GATEWAY POLL RATES

(71) Applicant: HONEYWELL INTERNATIONAL INC., Charlotte, NC (US)

(72) Inventors: Paul Wacker, Plymouth, MN (US); Gutha Stalin Sanghamitra, Bangalore (IN); Suresh Vemuri, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 116 days.

(21) Appl. No.: 17/499,584

(22) Filed: Oct. 12, 2021

(65) Prior Publication Data

US 2022/0034541 A1 Feb. 3, 2022

Related U.S. Application Data

(63) Continuation of application No. 16/739,616, filed on Jan. 10, 2020, now Pat. No. 11,156,972, which is a
(Continued)

(51) Int. Cl.
*F24F 11/49* (2018.01)
*F24F 11/30* (2018.01)
(Continued)

(52) U.S. Cl.
CPC .............. *F24F 11/49* (2018.01); *F24F 11/30* (2018.01); *F24F 11/62* (2018.01); *G05B 15/02* (2013.01);
(Continued)

(58) Field of Classification Search
CPC . G05B 15/02; F24F 11/62; F24F 11/63; F24F 11/52; G24F 11/30; H04L 12/2816; H04L 43/0817; H04L 43/10; H04L 43/16
(Continued)

(56) References Cited

U.S. PATENT DOCUMENTS

| | | | | |
|---|---|---|---|---|
| 5,447,037 A | * | 9/1995 | Bishop | F24F 11/30 165/251 |
| 5,729,474 A | * | 3/1998 | Hildebrand | F24F 11/38 702/184 |

(Continued)

FOREIGN PATENT DOCUMENTS

| | | |
|---|---|---|
| EP | 2866117 A1 | 4/2015 |
| GB | 2442628 B | 9/2008 |

OTHER PUBLICATIONS

Carrier Enterprise Inc., "Founten User Guide," 39 pages, downloaded Nov. 16, 2015.

(Continued)

*Primary Examiner* — Nicholas R Taylor
*Assistant Examiner* — Chong G Kim
(74) *Attorney, Agent, or Firm* — Seager, Tufte & Wickhem, LLP

(57) ABSTRACT

A system for light commercial building solutions (LCBS). Solutions and other systems may incorporate lightweight alerting service, auto-adjustment of gateway poll rates based on the needs of various consuming applications, detecting loss of space comfort control in a heating, ventilation and air conditioning (HVAC) system, HVAC capacity loss alerting using relative degree days and accumulated stage run time with operational equivalency checks, and HVAC alerting for loss of heat or cool capacity using delta temperature and dependent system properties. Also, incorporated may be triggering s subset of analytics by automatically inferring HVAC equipment details from controller configuration details, ensuring reliability of analytics by retaining logical continuity of HVAC equipment operational data even when controllers and other parts of the system are replaced, and an LCBS gateway with workflow and mechanisms to associate to a contractor account.

18 Claims, 10 Drawing Sheets

Related U.S. Application Data continuation of application No. 15/001,192, filed on Jan. 19, 2016, now Pat. No. 10,545,466.

(51) Int. Cl.
| | |
|---|---|
| *F24F 11/52* | (2018.01) |
| *F24F 11/62* | (2018.01) |
| *F24F 11/63* | (2018.01) |
| *G05B 15/02* | (2006.01) |
| *H04L 12/28* | (2006.01) |
| *H04L 43/0817* | (2022.01) |
| *H04L 43/10* | (2022.01) |
| *H04L 43/16* | (2022.01) |

(52) U.S. Cl.
CPC ...... *H04L 12/2816* (2013.01); *H04L 43/0817* (2013.01); *H04L 43/10* (2013.01); *H04L 43/16* (2013.01); *F24F 11/52* (2018.01); *F24F 11/63* (2018.01)

(58) Field of Classification Search
USPC .......................................................... 709/223
See application file for complete search history.

(56) References Cited

U.S. PATENT DOCUMENTS

| | | | |
|---|---|---|---|
| 6,385,510 | B1 | 5/2002 | Hoog et al. |
| 6,496,858 | B1 | 12/2002 | Frailong et al. |
| 7,281,134 | B2 | 10/2007 | Schmit |
| 7,308,384 | B2 | 12/2007 | Shah et al. |
| 7,354,005 | B2 | 4/2008 | Carey et al. |
| 8,214,496 | B2 | 7/2012 | Gutt et al. |
| 8,437,878 | B2 | 5/2013 | Grohman et al. |
| 8,470,431 | B2 | 6/2013 | Wilhelm |
| 8,731,724 | B2 | 5/2014 | Drees et al. |
| 8,855,825 | B2 | 10/2014 | Grohman |
| 9,057,649 | B2 | 6/2015 | Steinberg et al. |
| 9,747,618 | B1 * | 8/2017 | Reiss ................. G06Q 30/0275 |
| 2009/0032235 | A1 * | 2/2009 | Sullivan ................... F24F 11/83 |
| | | | 165/247 |
| 2009/0240193 | A1 | 9/2009 | Mensinger et al. |
| 2011/0290893 | A1 * | 12/2011 | Steinberg ........... G05D 23/1905 |
| | | | 236/51 |
| 2012/0230661 | A1 * | 9/2012 | Alhilo ...................... G05B 5/01 |
| | | | 392/441 |
| 2013/0158717 | A1 | 6/2013 | Zywicki et al. |
| 2013/0163491 | A1 | 6/2013 | Singh et al. |
| 2013/0211559 | A1 | 8/2013 | Lawson et al. |
| 2013/0212214 | A1 | 8/2013 | Lawson et al. |
| 2013/0261808 | A1 * | 10/2013 | Besore ............... G05D 23/1904 |
| | | | 700/278 |
| 2013/0338837 | A1 | 12/2013 | Hublou et al. |
| 2014/0059466 | A1 | 2/2014 | Mairs et al. |
| 2014/0081465 | A1 | 3/2014 | Wang et al. |
| 2014/0082177 | A1 | 3/2014 | Lemire et al. |
| 2014/0266669 | A1 | 9/2014 | Fadell et al. |
| 2014/0325291 | A1 | 10/2014 | Spivey et al. |
| 2014/0343886 | A1 | 11/2014 | Berinato et al. |
| 2015/0095478 | A1 | 4/2015 | Zuerner |
| 2015/0124849 | A1 * | 5/2015 | Parthasarathy ........ G05B 23/00 |
| | | | 374/4 |
| 2015/0124850 | A1 * | 5/2015 | Parthasarathy ........ G01N 25/72 |
| | | | 374/4 |
| 2015/0156031 | A1 | 6/2015 | Fadell et al. |
| 2015/0200846 | A1 | 7/2015 | Hui et al. |
| 2015/0276255 | A1 * | 10/2015 | Honda ..................... F24F 11/83 |
| | | | 62/216 |
| 2015/0330841 | A1 * | 11/2015 | Kern ....................... G06F 1/206 |
| | | | 702/136 |
| 2015/0345846 | A1 * | 12/2015 | Kopko ................... F25B 13/00 |
| | | | 62/115 |
| 2016/0034329 | A1 | 2/2016 | Larson et al. |
| 2016/0209071 | A1 | 7/2016 | Golden et al. |
| 2016/0226732 | A1 | 8/2016 | Kim et al. |
| 2016/0234186 | A1 * | 8/2016 | Leblond ................. H04L 63/08 |
| 2016/0245538 | A1 | 8/2016 | Amer et al. |
| 2017/0041271 | A1 | 2/2017 | Tal et al. |
| 2017/0041388 | A1 | 2/2017 | Tal et al. |
| 2017/0070563 | A1 | 3/2017 | Sundermeyer et al. |
| 2017/0187625 | A1 | 6/2017 | Nolan et al. |
| 2017/0187642 | A1 | 6/2017 | Nolan et al. |
| 2017/0195866 | A1 | 7/2017 | Kim et al. |
| 2017/0202039 | A1 | 7/2017 | Logue et al. |
| 2017/0206752 | A1 | 7/2017 | Wacker |
| 2018/0345859 | A1 * | 12/2018 | Zehr ....................... G08B 21/14 |
| 2021/0016624 | A1 * | 1/2021 | Gilgeours .......... B60H 1/00978 |

OTHER PUBLICATIONS

U.S. Appl. No. 15/001,180, filed Jan. 19, 2016.
U.S. Appl. No. 15/001,194, filed Jan. 19, 2016.
U.S. Appl. No. 15/001,200, filed Jan. 19, 2016.
U.S. Appl. No. 15/001,203, filed Jan. 19, 2016.
U.S. Appl. No. 15/001,210, filed Jan. 19, 2016.
U.S. Appl. No. 15/001,216, filed Jan. 19, 2016.
U.S. Appl. No. 15/001,222, filed Jan. 19, 2016.
EcoFactor, "HVAC Performance Monitoring Service," 4 pages, 2015.
Enphase Energy, "Envoy Communications Gateway, Installation and Operation Manual," Rev. 04, 52 pages, 2014.
Gao et al., "A System-level Fault Detection and Diagnosis Method for Low Delta-T Syndrome in the Complex HVAC Systems," Applied Energy, 12 pages, Mar. 2015.
Ge, "Proficy Automation Software, Enabling Real-Time Operational Intelligence," 12 pages, Feb. 2014.
Honeywell, "RedLINK Wireless ComfortSystems," 8 pages, Nov. 2013.
http://www.ecobee.com/2014/09/upgrading-to-ecobee3/, "Upgrading to Ecobee3, Smart WiFi Thermostats by Ecobee," 8 pages, printed Sep. 29, 2015.
Li et al., "Application of Pattern Matching Method for Detecting Faults in Air Handling Unit System," Automation in Construction, vol. 43, pp. 49-58, 2014.
Pelican Wireless Systems, "User Guide," 39 pages, downloaded Nov. 14, 2015.
Salsbury et al., "Fault Detection in HVAC Systems Using Model-Based Feedforward Control," downloaded from http://www.standbylbl.gov/epb/publications/fault-detection.pdf, 22 pages, downloaded Nov. 16, 2015.
SecoMea, "Remote Management—SiteManager 1439 and 3439," 3 pages, Sep. 14, 2013.
Zhang et al., "Demo Abstract—BuildingSherlock: Fault Management Framework for HVAC Systems," BuildSys' 2014, 2 pages, Nov. 5-6, 2014.

* cited by examiner

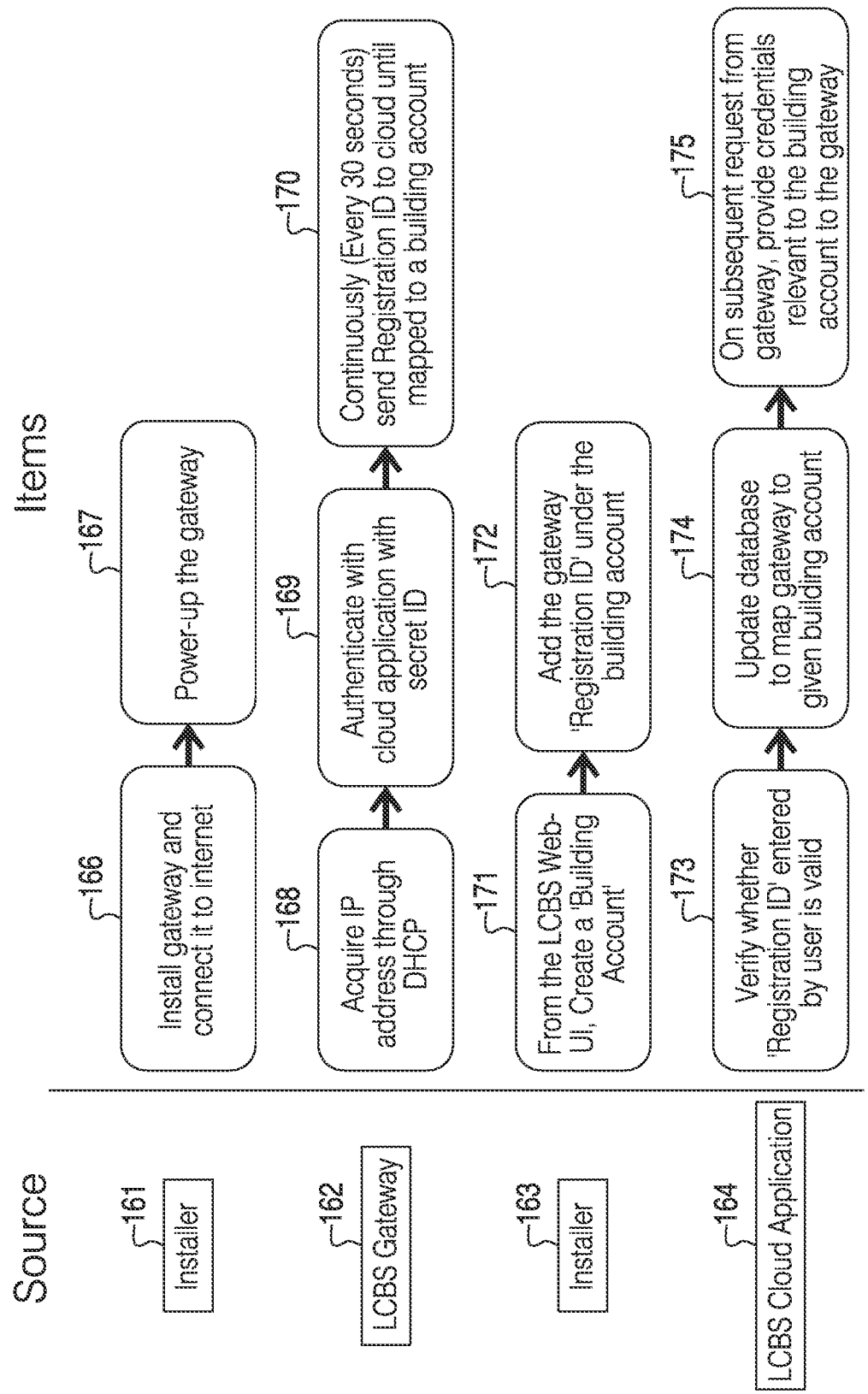

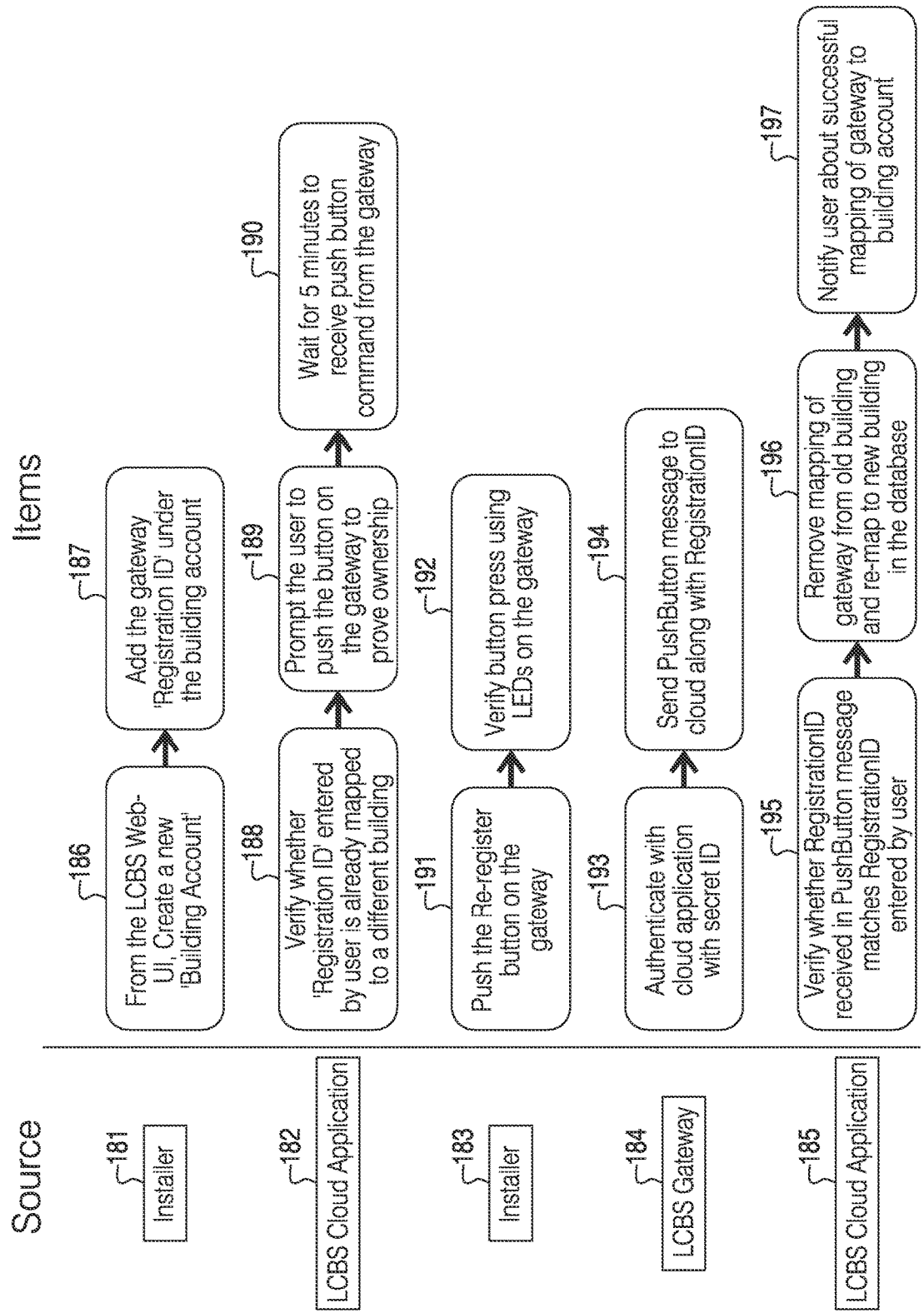

SYSTEM FOR AUTO-ADJUSTMENT OF GATEWAY POLL RATES

This application is a continuation of U.S. patent application Ser. No. 16/739,616, filed Jan. 10, 2020, which in turn is a continuation of U.S. patent application Ser. No. 15/001,192, filed Jan. 19, 2016. U.S. patent application Ser. No. 15/001,192, filed Jan. 19, 2016, is hereby incorporated reference. U.S. patent application Ser. No. 16/739,616, filed Jan. 10, 2020, is hereby incorporated by reference.

BACKGROUND

The present disclosure pertains to building system controls. The disclosure particularly pertains to, for example, alerts, detecting comfort, heating and cooling capacity, analytics, and gateways.

SUMMARY

The disclosure reveals a system having adjustable gateway poll rates. It may have a mechanism that provides a role-based gateway function or an external gateway device that allows for applications registering with the gateway to dynamically specify a subset group of synchronized data objects needed by the applications, and specify a data rate. A subscription of each application may have a message and a destination. The gateway may accept formalized predefined role subscriptions and custom role subscriptions. The formalized predefined role subscriptions may be for common types of applications that need unique data objects and rates for their services. The custom role subscriptions applications are for applications of the uncommon type. A role for the predefined role subscriptions may be selected from a group incorporating system commissioning status viewing, energy analyses data logging, an equipment fault detection and diagnostic analytic engine, and maintenance trend logging, among other roles. A subscription that is transparent may be active just when the subscription is needed.

BRIEF DESCRIPTION OF THE DRAWING

FIG. 9 and FIG. 10 are diagrams that relate to registering a gateway with a building account.

DESCRIPTION

Figure 1:
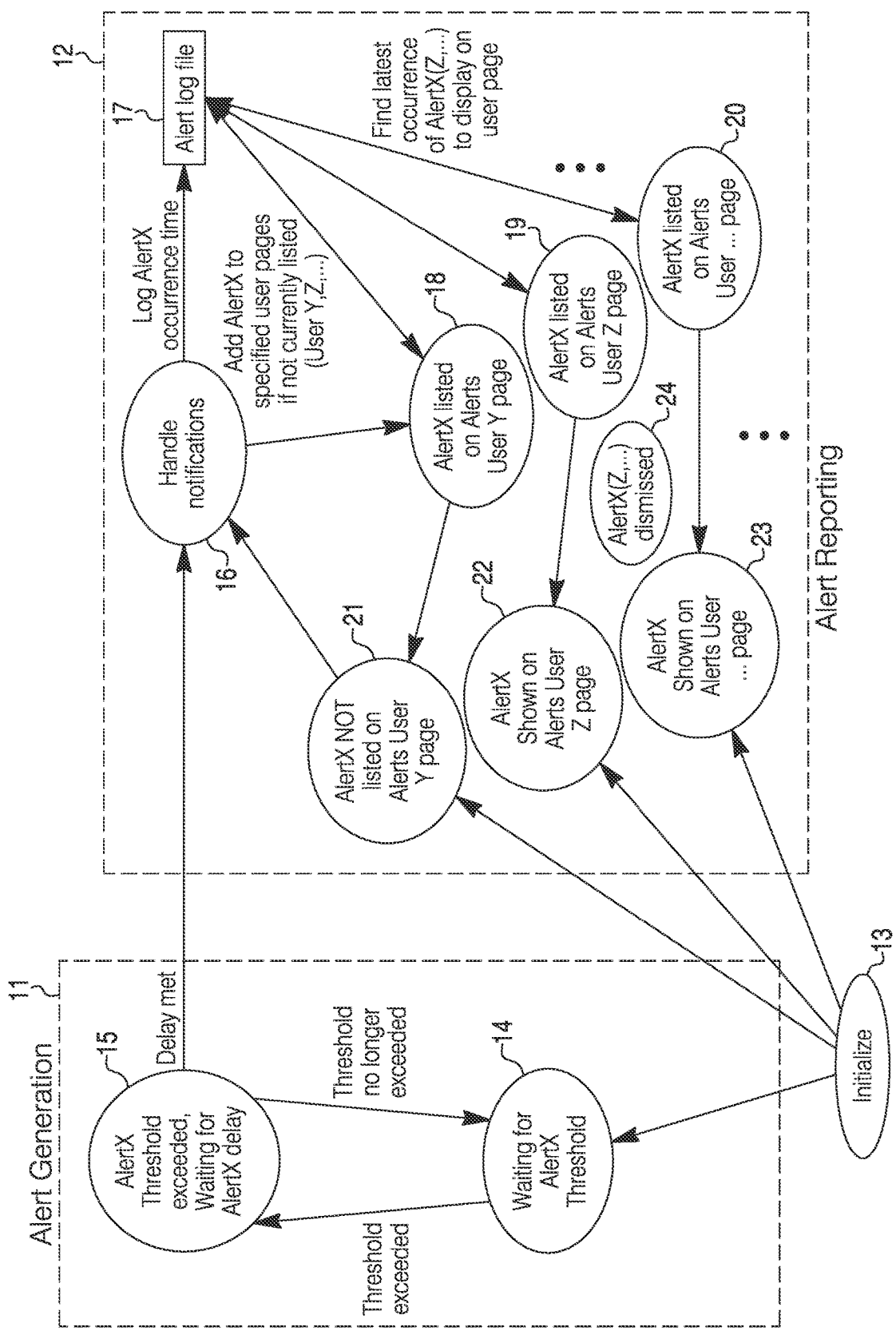
FIG. 1 is a diagram of a generation and alert reporting system.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

A term heat exchanger may refer to a device used to transfer heat among one or more fluids. A heat exchanger may be used for heating, or cooling, such as air conditioning. The term heat exchanger may be regarded as having greater breadth, larger coverage or be more encompassing than a term heating or cooling system. The term heating or cooling system may be regarded as having greater breadth, larger coverage or be more encompassing than a term heating, ventilation and air conditioning (HVAC) system. A term equipment may be regarded as having greater breadth, larger coverage or be more encompassing than the above-noted terms. Equipment may also refer to one or more items from lighting, fire, security, video, air control, and audio systems. The equipment may incorporate one or more other systems. The above-noted terms may have various meanings in different contexts.

Upper and lower case letters, with or without associated numbers, may be one or more items of a group comprising numbers, numerical values, predetermined numbers, and predetermined numerical values.

A lightweight alerting system may be noted. Independent heating, ventilation and air conditioning (HVAC) mechanical contractors that provide service contracts for small commercial buildings may need a mechanism for easily digesting analytic information that is generated with reference to the health and status of equipment and occupant comfort for the buildings they service. The contractors are not necessarily controls experts or building operators. Within the building management services (BMS) industry, alarming and alarm handling may be developed with rigorous workflows that can allow building operators deal with multiple integrated subsystems such as lighting, fire, and security. The work flows due to the rigor necessitated by operators in industries like pharmaceutical industries may be burdensome to contractors who are responsible for the HVAC equipment of many buildings, because of the amounts of data that can be generated and the interactions required. Also, because these contractors are small to medium sized businesses, their operational practices may be quite different from contractor to contractor, so there is necessarily no common work flow that can be adopted, and the classic legacy alarming workflow may have been rejected by them as inefficient. Therefore, an alerting service that is easy and informative may be desired.

The lightweight alerting system may enable delivering of valuable and timely notifications to operators and/or maintainers of buildings and equipment with only minimum overhead. This appears to be in contrast to traditional BMS alarming services that produce large files flooded with repeated alarms and return to normal records to sort, acknowledge and track.

An alert may be a reporting of an event record. An event may pertain to a threshold of some kind that has been crossed. An alert may either be a sensed value going outside a specific bound, or an analytic value exceeding a specified bound.

An alert may by default be logged when it has occurred, along with the current value of the object to which the alert threshold has been applied. Optionally, the alert may be configured to appear on a contractor's alert page display or dashboard on, for example, a pad, notebook, tablet, smartphone, laptop, or an office computer via a wire and/or wireless connection.

Multiple alert priorities may be shown on the alert page to allow for categorization and actions required. An example may be "high priority" that indicates that immediate action should be taken, "medium priority" that indicates that an action should be taken during a next service call or intervention, and "low priority" that indicates that an issue should be logged with an optional service interaction.

A push notification may be another option that can be triggered by an alert. Push notification content may indicate who is to receive the message and how the message will be delivered. The notification may be tailored per event.

An alert may be a record of the event that a threshold has been crossed, and exists regardless of whether the condition goes back below the threshold. Depending on how a contractor wants to deal with alerts on different object values, the contractor may set different alerts with different thresholds on the same object. For example, the contractor may set a lower threshold that puts a low level alert into the log file to help with tracking possible issues, and they could set a second alert on the same object using a higher threshold (with a push notification) that indicates immediate attention is needed.

If an object that generated an alert crosses the threshold back to an un-alerted value, a crossing may be reflected in the current status of the object associated with the alert. If the object re-crosses the threshold (e.g., it is intermittent), then a new instance may be time-stamped and logged. An alert status screen may always just show a last occurrence of the particular alert (until it is dismissed), and its current status (whether over the alert threshold or not). If the alert has a push notification associated with it, the user may be able to specify if pushed every time it goes away and comes back, or only after it has been dismissed.

The "user" should be able to dismiss service alerts from their alert status page once the user has dealt with them. To dismiss a service alert may mean to remove it from the user's active alert page, such that the alert is only visible in the log.

FIG. 1 is a diagram of generation and alert reporting as indicated by symbols 11 and 12, respectively. An initialization of the alert may occur at symbol 13. At symbol 14, there may be a wait for an alert X threshold. If the threshold is exceeded, then there may be a wait for an alert X delay at symbol 15. If the threshold is no longer exceeded, then a return may be made to symbol 14 where a wait for the alert X threshold may ensue. It may be noted that it is a one shot event from the state at symbol 15, which may occur when the delay time is met. In order to generate another alert X occurrence, the state at symbol 15 needs to be exited by a "threshold no longer exceeded" action back to the "waiting for alert X threshold" state at symbol 14.

If the alert X delay is met at symbol 15, then notifications may be handled at symbol 16 of the alert reporting in symbol 12. An alert X occurrence time from symbol 16 may be logged in the alert log file at symbol 17. Alert X may be added to specified user pages in not currently listed (User Y, Z, . . . ) from symbol 17 to symbol 18 where alert X is listed on alerts user Y page. From alert log file at symbol 17, alert X may be added to user pages if not currently listed to symbols 18, 19, 20, and so on, that indicate alert X listed on alerts user Y page, alert X listed on user Z page, alert X listed on alerts user . . . page, and so on, respectively. A latest occurrence of alert X (Z,. . . ) to display may be found on a user page.

From initialize at symbol 13, a signal may go to a symbol 21 at alert reporting at symbol 12. Symbol 21 may indicate alert X as not listed on alerts user Y page. Also from initialize at symbol 13 may be a signal to symbol 22, symbol 23, and so on. Symbol 22, symbol 23 and so on, may indicate an alert X shown on alerts user Z page, alert X shown on alerts user . . . page, and so on, respectively.

From symbols 18, 19, 20, and so on, representing indicated content, respectively, signals may go to symbols 21, 22, 23, and so on, representing indicated content, respectively. Symbol 24 may indicate that alert X (Z, . . . ) may be dismissed. (Note going from symbol 21 to 16.)

Auto-adjustment of gateway poll rates based on the needs of various data consuming applications may be noted. As devices are connected together in a developing internet of things (IoT), connected devices may be called on to supply data to many different types of applications and services, some of which may even be unknown at the time of deployment. High data exchange rates (communication bandwidth) may imply significant trade-offs between value and cost. Sending all possible data at the fastest possible rate may mean maintaining very expensive data channels, and substantial effort to extract a subset of important information from a huge stream of data. Conversely, sending limited data at slower rates may not necessarily provide enough information, or a fast enough response to meet the needs of a data client's application. Examples of applications that might subscribe to a sensor value and have different needs may incorporate live monitoring of a value to debug a system, creating a general trend log, running an fault detection and diagnostic (FDD) algorithm, resetting control loop properties, and/or so forth.

What is desired may be providing a role based on a gateway function (as part of an IoT device interface or as an external gateway device) that allows for applications registering with the gateway to dynamically specify a subset group of synchronized data objects that the applications need, and at what rate. Each subscription may have a different message and a destination, or a common destination (e.g., a cloud) directed to different services within the destination. This may allow any application to subscribe to updates from a data object to meet its specific needs. Some services may do this for individual object values when combined with change of value (COV) thresholds. Many other services trying to meet this need may rely on various formats of polling for the data, which can consume much more bandwidth.

The gateway may publish a data model of the information that it has access to, and an available update resolution (if one reads it faster than this, the process that generates will not have done so and one will get the same value as the last one read). The gateway may accept formalized predefined role subscriptions and custom role subscriptions. The predefined system roles may be for the common application types that need unique data objects and rates for their services. Example common roles may incorporate system commissioning status viewing, energy analysis data logging, equipment FDD analytic engine, and maintenance trend logging. The subscriptions may be transient such that they will only be active when needed. An example of why this is useful may be for the system commissioning status viewing role. Commissioning a system may require much data at high data rates, but only for a subset of specific devices for a short period of time, and not very often in the lifetime of a system. During the rare occurrence of commissioning activity, the needed specific high speed data may be collected and only sent to the proper subscriber; the other subscribers (with different roles but using some of the same data), would not necessarily be subjected to the high speed data stream that is temporarily created for the common objects needed by their application roles. Routing and buffering capabilities may then account for the high temporary bandwidth needs without having to provide an infrastructure for the rare worst case data rate requirement.

Figure 2:
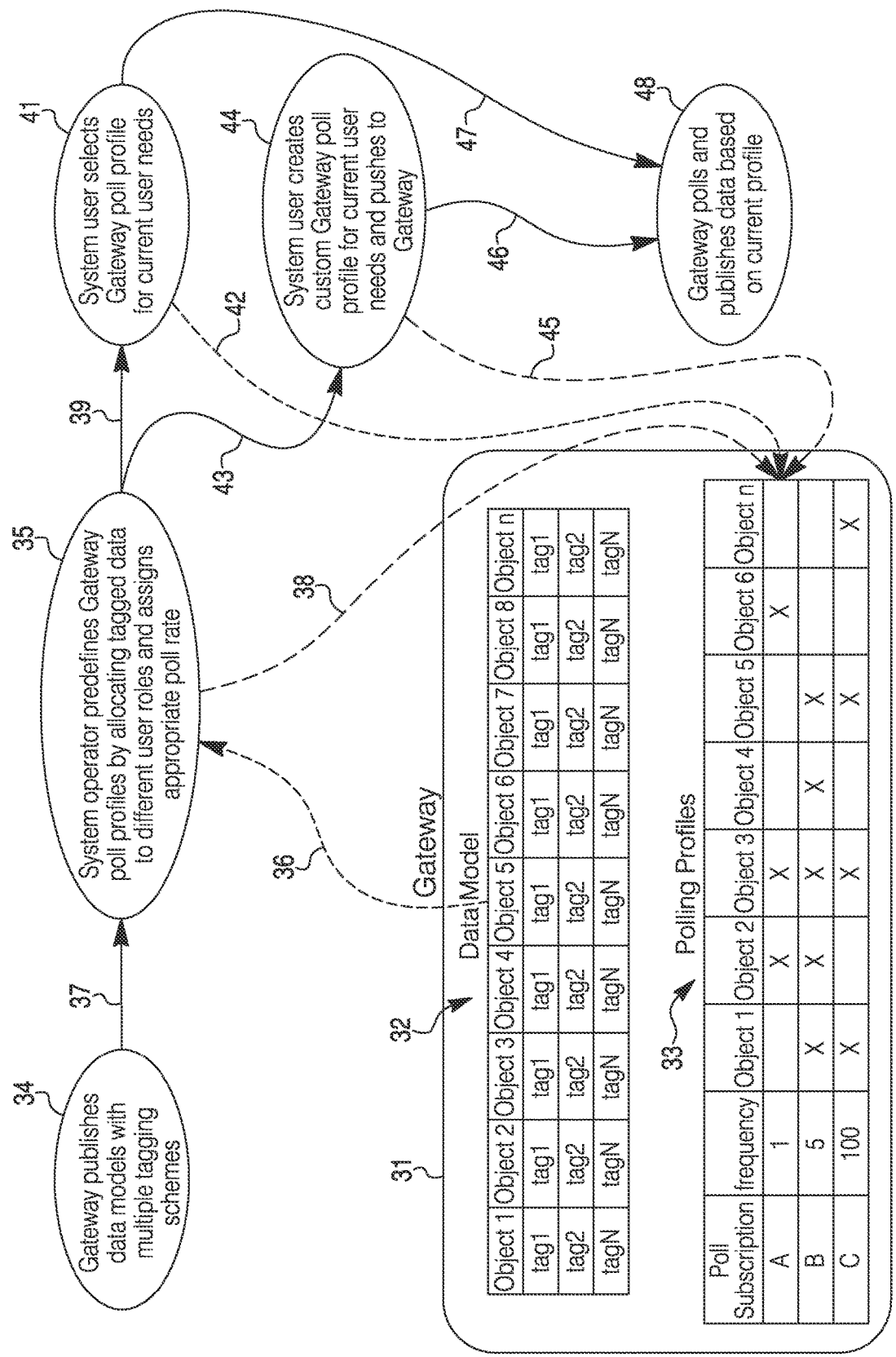
FIG. 2 is a diagram of an auto-adjustment mechanism for gateway poll rates.

FIG. 2 is a diagram of auto-adjustment of gateway poll rates based on needs of various data consuming applications. A gateway 31 may have a data model table 32 having objects 1 through n. Each object may have tags 1 through N. "n" and "N" are not necessarily the same numbers. Gateway 31 may have a polling profiles table 33. Polling profiles may have, for example, poll subscription A, B and C. There may be more or fewer poll subscriptions. Each poll subscription may designate a certain frequency of occurrences, for instance, A may be one, B may be five, and C may be 100. The poll subscriptions may designate other frequencies. Certain poll subscriptions may be designated for each object with an "X" in a row of a column for the respective object. For example, object 5 may have poll subscriptions B and C designated.

At symbol 34, gateway 31 may publish data models with multiple tagging schemes. After symbol 34, as noted by arrow 37, a system operator may predefine gateway 31 poll profiles 33 by allocating tagged data, as indicated by dashed arrow 36 to different user roles, and may assign an appropriate rate, as indicated by dashed arrow 38, at symbol 35. As noted by arrow 39, after symbol 35, the system operator or user at symbol 41, may select a gateway 31 poll profile from polling profiles 33, as indicated by dashed arrow 42, for current user needs. Also after symbol 35, as noted by arrow 43, at symbol 44, the system user may create a custom gateway poll profile from polling profiles table 33, as indicated by dashed arrow 45, for current user needs and may push to gateway 31. From symbols 41 and 44, as noted by arrows 46 and 47, gateway 31 may poll and publish data based on a current profile at symbol 48.

Detecting a loss of space comfort control in an HVAC system may be noted. It may be valuable for an HVAC maintenance contractor or building operator to be automatically warned when control of a temperature in a space not necessarily maintained. A common way of reporting an exclusion past simple temperature alarm limits may have issues that prevent a timely and reliable indication of loss of control. For instance, if there are multiple set points used throughout the building operation (either automatically scheduled or user adjusted), then a single limit may need to be outside the worst case set point, and therefore will not necessarily provide a timely notification if issues occur during other set points. Even if the limits are scheduled to match the set point schedule, this would not necessarily account for manual set point changes or even a recovery time needed to go from set points requiring less energy to those that require more, since HVAC equipment may have widely divergent recovery times dependent on the sizing practices and variability of heating and cooling loads. This means that a wide buffer for triggering, or needing to wait for a long period outside the limits to make sure a legal disturbance had not occurred, may lead to discomfort before notification, and reduce the value of an alert, since it may likely be that occupants would already have registered a complaint by the time one is sure that the event was not a false alarm.

Instead of watching for a controlled variable to make an excursion outside of a fixed value, an approach of anticipating when a loss of control (and comfort) may occur. This may be done by watching the proportional error (which is the instantaneous difference in the set point and the controlled variable), while ignoring proportional errors of reasonable duration due to set point changes. The approach may work for both heating and cooling and any set point since the mode can be known (heat or cool), and a proportional error may be directionally adjusted for general testing. A strategy may involve several criteria for determining loss of control. A first item may be that the proportional error (the difference between the set point and the controlled variable where a positive number represents a needing a larger value of the controlled output, e.g., for heat, space temperature control=setpoint−space temperature.) may need to be larger than what would be expected for steady state control but smaller than what would be noticeably uncomfortable. A second may be that the heating equipment should not be recovering from a set point change (as this would be a period of time that under normal circumstances when it would be expected that the proportional error would be returned to within the defined limit from of the first item), and may be dynamically calculated by monitoring the active set point and the mode. A third item may be if the proportional error is outside of the limit from the first item, and the control is not in a state of recovery from the second item, and the derivative (rate of change) of the proportional error is such that it will not get within the range of the first item in a reasonable time, then the alert may be triggered. Also one may note that is the sensed value (in this case the space temperature) has any noise on it, the derivative readings should be filtered to prevent inaccurate conclusions.

The approach may be implemented as logic directly into thermostats, in local servers that supervise and monitor the buildings where the zone control equipment operates, or in remote or cloud based systems that have access to operational data of the building controls.

Figure 3:
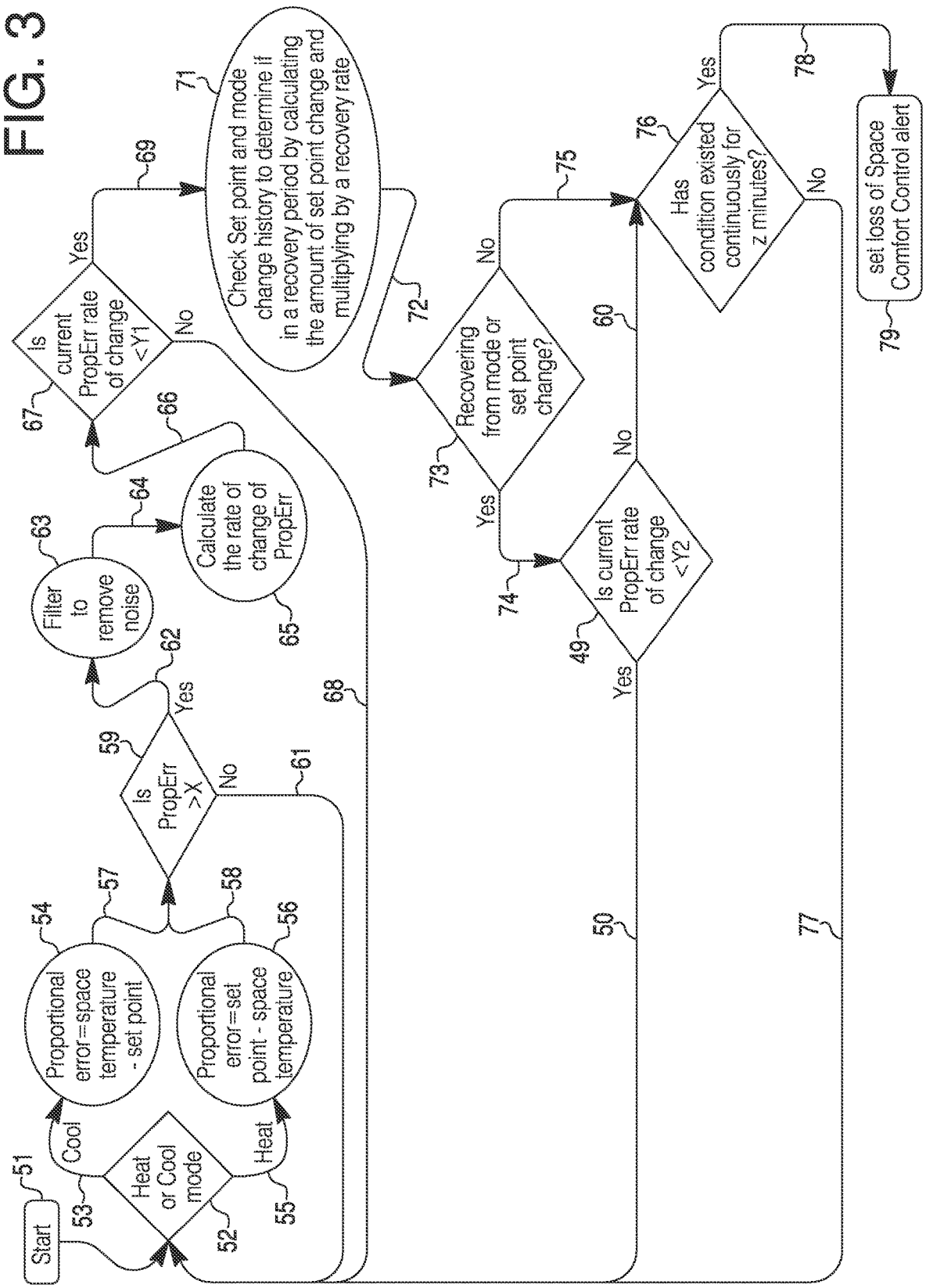
FIG. 3 is a diagram of a mechanism for detecting a loss of space comfort control in a system.

FIG. 3 is a diagram of detecting a loss of space comfort control in an HVAC system. A start at symbol 51 may lead to a selection or indication of a heat or cool mode of the HVAC system. A cool mode selection at a symbol 52 may be noted by an arrow 53 to a symbol 54 indicating a proportional error equal to a space temperature minus a set point. A heat mode selection at symbol 52 may be noted by an arrow 55 to a symbol 56 indicating a proportional error equal to a set point minus a space temperature. Arrows 57 and 58 may lead from symbols 54 and 56, respectively, to a symbol 59 that asks whether the proportional error is greater than X. X may be settable for an application, and would typically be a value that is larger than what would be expected from steady state control, but smaller than what would be noticeably uncomfortable (e.g., −1.5 degrees F.).

If an answer to the question at symbol 59 is no, then a return to symbol 52 may be made as indicated by an arrow 61. If an answer to the question at symbol 59 is yes, then an arrow 62 may go to a symbol 63 where a filter may be used to remove noise from the proportional error signal. As indicated by arrow 64 from symbol 63, a rate of change of the proportional error may be calculated at symbol 65. From symbol 65, as noted by arrow 66 to symbol 67, a question of whether a current proportional error rate of change is less than Y1 may be asked. Y1 may be settable for the application, and may typically be a value that would represent whether the rate of change means that the proportional error will become less than X in a reasonable amount of time.

If an answer to the question at symbol 67 is no, then a return to symbol 52 may be made as shown by arrow 68. If answer to the question is yes, then an arrow 69 may lead to a symbol 71. As indicated by symbol 71, a set point and mode change history may be checked to make a determination relative to a recovery period by calculating the amount of set point change and multiplying it by a recovery rate. Recovery rates may differ for different types of heating and cooling equipment.

From symbol 71 along an arrow 72 to a symbol 73, a question of whether there is a recovery from a mode or set point change may be asked. If an answer is yes, then an arrow 74 may go to symbol 49 where a question of whether a current proportional error rate of change is less than Y2. Y2 may be settable for the application, and would typically be a value that would represent whether the rate of change means the proportional error will become less than X in a reasonable amount of time. If an answer is yes, then a return to symbol 52 may be made as shown by arrow 50. If the answer at symbol 49 is no, then an arrow 60 may go to symbol 76. If the answer at symbol 73 is no, then an arrow 75 may go to symbol 76 where a question whether the condition has existed continuously for Z minutes may be asked. Z may be adjustable based on application dynamics. If an answer to the question is no, then, according to an arrow 77, a return to symbol 52 may be made. If an answer is yes, then a loss of space comfort control alert may be set at symbol 79 as led to by arrow 78.

HVAC capacity loss alerting may use relative degree days and accumulated stage runtime with operational equivalency checks may be noted. It may be valuable for HVAC maintenance contractors to be automatically warned when equipment loses some of its capacity. Some fault detection and diagnostic (FDD) approaches may have been developed to provide such information; however, reliable approaches may need specific (non-standard) sensors or detailed equipment specs and/or installation details that are expensive to install or obtain, and do not necessarily exist in many cases. The approaches, while being expensive to implement, may also be limited to only a single specific model of a single manufacturer, among thousands of models and many manufacturers, and therefore might be difficult to deploy efficiently.

A solution may incorporate a reliable capacity loss calculation that utilizes information readily available, such as the total runtime associated with a particular load profile. Degree days may have been used for general energy use comparisons, but that calculation is not necessarily accurate enough (i.e., does not account for dependent variables that also affect a load) for reliably determining changes in capacity. A more reliable and accurate load calculation (which can be called relative degree days (RDDs)) may take into account key runtime dependent variables such as latent building mass energy storage, and capacity differences based on controlling to different thermostat set points. To account for thermal load differences associated with controlling to different set points at the same outdoor temperature, a relative degree day calculation may integrate a difference in the outdoor air temperature from a current set point. To account for energy storage and internal load variations, one may need only to make comparisons of the ratio of relative degree days to an adjusted equipment runtime when the effective occupied profiles, for a time interval such as an entire week, match.

In the approach, relative degree days may be integrated across a time frame, such as a week, that can provide a similar load profile based on occupancy patterns (profiles), and indexed to those occupancy profiles. When similar occupancy profiles are encountered (many buildings may generally have only a few regular weekly occupancy profiles that occur frequently), then the ratio of RDDs to accumulated stage runtimes may represent a relative amount of effort that the equipment is using to regulate a normalized load, and thus may be used as an effective measure of differences in capacity. Even though the approach may be slow under normal circumstances, the issues that lead to loss of capacity may occur gradually over months of time.

Figure 4:
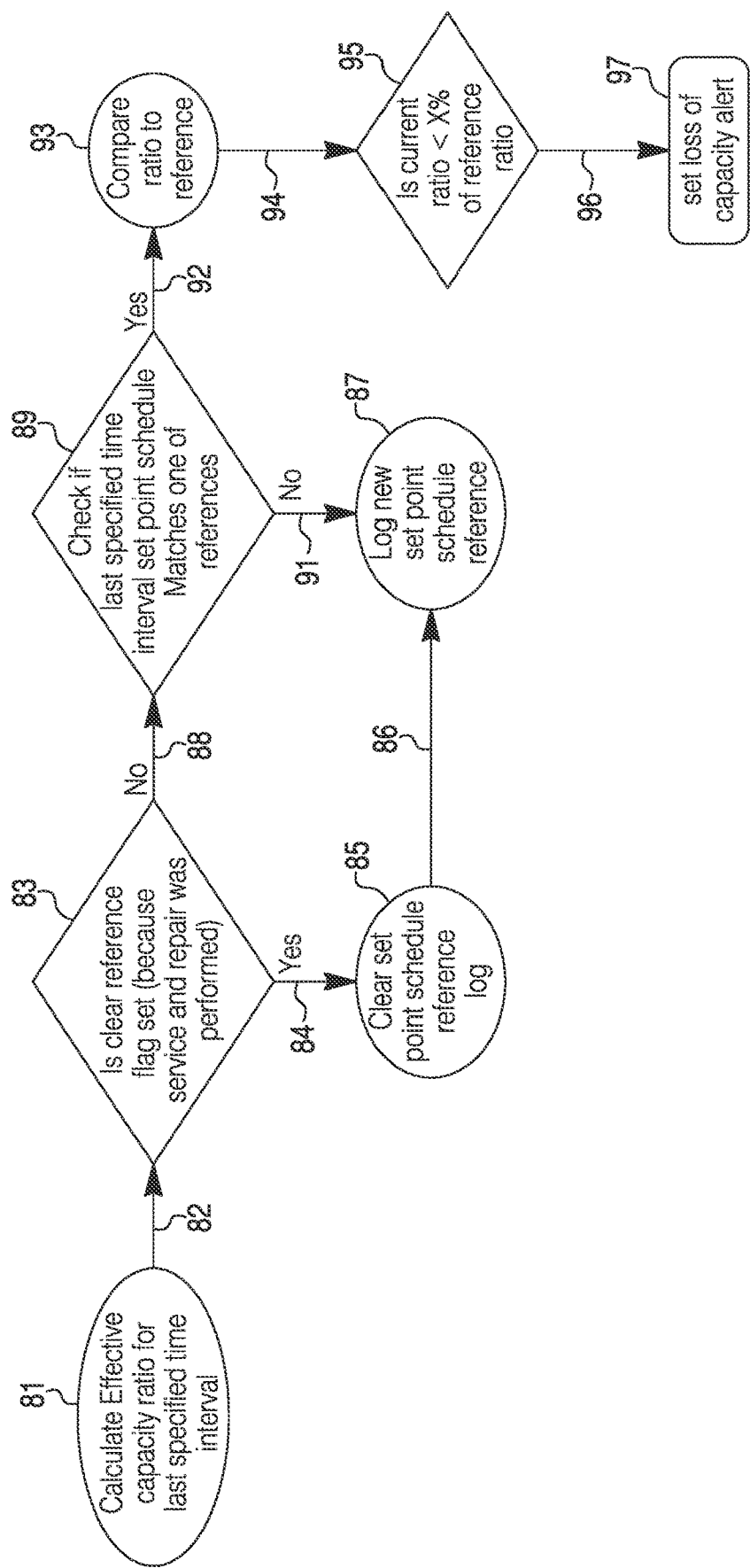
FIG. 4 is a diagram showing a heating, ventilation and air conditioning capacity loss alerting system using relative degree days and accumulated run time.

FIG. 4 is a diagram showing a system for HVAC capacity loss alerting using relative degree days and accumulated run time with operational equivalency checks. At a symbol 81, an effective capacity ratio may be calculated for a last specified time interval. The effective capacity ratio may be relative degree days for the last specified time interval and divided by accumulated stage run time for the same interval.

An arrow 82 may lead to a symbol 83 that may ask a question of whether a clear reference flag is set because service and repair were performed. If an answer is yes, then an arrow 84 may lead from symbol 83 to a symbol 85 where a set point schedule reference log may be cleared. From symbol 85, an arrow 86 may lead to a symbol 87 where a new set point schedule reference may be logged.

If an answer to the question in symbol 83 is no, then via an arrow 88 to a symbol 89, a question of whether a last specified time interval set point schedule matches one of the references may be asked. If an answer to the question is no, then as noted be arrow 91 a new set point schedule reference may be logged at symbol 87. If an answer to the question is yes, then an arrow 92 may lead to a symbol 93 where the ratio is compared to a reference. From symbol 93 along arrow 94 to a symbol 95, a question may be whether the current ratio is less than X% of a reference ratio. If so, than then an arrow 96 may lead to symbol 97 where a loss of capacity alert is set.

HVAC alerting for loss of heat or cool capacity may use delta T and dependent system properties. An approach may be provided to determine if the capacity of an HVAC unit has degraded using readily available operational data. In order to determine if the heating or cooling capacity of an HVAC unit has changed, one may compare the "dT" defined as a change in dry bulb temperature of the air as it passes through the heat exchanger where dT=|Tair (before heat exchanger)−Tair (after heat exchanger)|. There may be separate values tracked for heating and cooling. However, for this to be accurate, it may need to be done in such a way that the normal operational properties of the system that vary the dT are controlled (since any variation of the following conditions may result in a change in capacity that is not due to system degradation such as a number of stages active, air flow, outdoor dry bulb temp, mixed air wet bulb temp, mixed air dry bulb temp). This may be done using two approaches: 1) by only measuring the dT when it has reached steady state; and 2) recording the associated system conditions so that future comparisons can be done against the same system conditions.

First, in order to provide a reliable approach to determine that dT has reached a steady state value, since stages are continually cycling and the time constants vary widely from, for instance, RTU to RTU, and even within a single RTU, the time constant can vary with flow, coil cleanliness, humidity, type (e.g., for heat-compressor vs. electric aux vs. gas aux), one may monitor the data to ensure that no state changes have recently occurred, and that the derivative of the discharge air temp is less than a threshold that will ensure the value is within ½ percent of its final value.

Second, in order to ensure that the dT comparisons are relevant, they should be done against equivalent system conditions, since any variation of the following conditions may result in a change in capacity that is not due to system degradation, such as air flow (proxy for this may be filter dp and econo pos), outdoor dry bulb, mixed air wet bulb temp, mixed air dry bulb temp. Therefore, these values may be recorded, so that over time, the steady state dT can be compared with past measurements under the same conditions.

Figure 5:
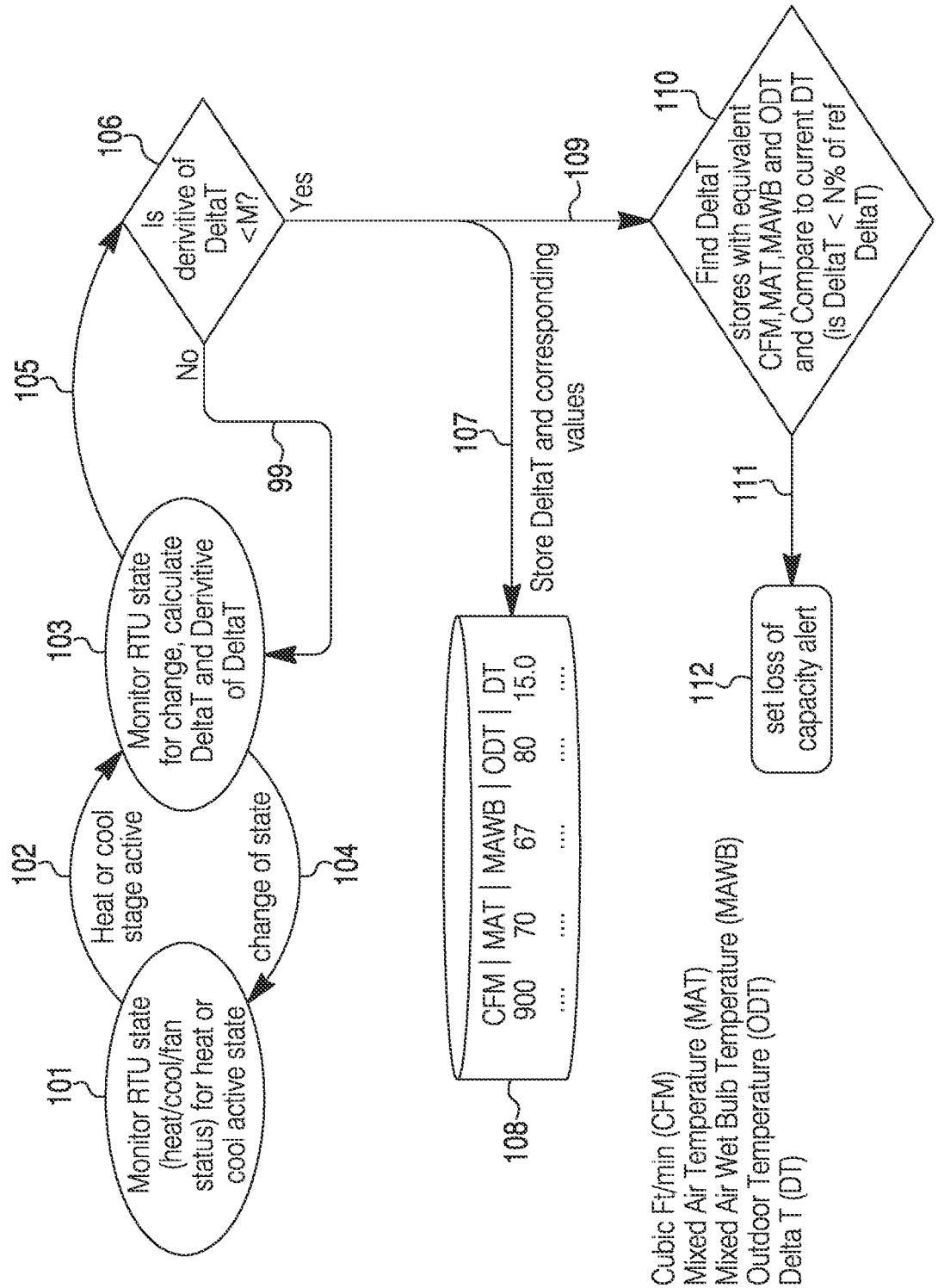
FIG. 5 is a diagram of a heating, ventilation and air conditioning alerting system for loss of heat or cool capacity using a delta temperature.

FIG. 5 is a diagram of HVAC alerting for loss of heat or cool capacity using DeltaT and dependent system properties. At symbol 101, an RTU (rooftop unit) state (i.e., heat/cool/fan commands) may be monitored. An arrow 102 from symbol 101 may indicate no state change to a symbol 103, where the RTU state may be monitored and a derivative of a discharge air temperature may be calculated. A state change may be indicated to symbol 101 via an arrow 104. As indicated by an arrow 105 from symbol 103, a DeltaT may be calculated at symbol 106. DeltaT and corresponding values may be stored in a database 108 as indicated by an arrow 107 from symbol 106. Values may incorporate cubic feet per minute (CFM), mixed air temperature (MAT), mixed air wet bulb temperature (MAWB), outdoor temperature (ODT), and delta temperature (DeltaT). Multiple levels of these values may be stored in accordance with time and/or events. An arrow 109 may lead from symbol 106 to a symbol 110 where DeltaT stores with equivalent values of CFM, MAT, MAWB and ODT are found and compared to a current DT. At symbol 110, a question asked is whether DeltaT is less than an N percent of a reference DeltaT. If an answer to the question is yes, then an arrow 111 leads to a symbol 112 where a loss of capacity alert is set.

The following may apply to equipment of various kinds. The HVAC equipment may be regarded herein as an illustrative example. Triggering a subset of analytics by automatically inferring HVAC equipment details from controller configuration details may be noted. Detecting HVAC equipment faults without causing false-positives may often require a complex configuration. For example: 1) A combination of rules and conditions to be checked may be so complex that an unskilled HVAC technician may not have the time or the ability to setup the configuration; 2) The rules may include a need to analyze the operational data from the equipment over a span of time—setting up algorithms that examine data streams or historical data may require skill and experience; and 3) An applicability of a particular automated fault detection (AFD) algorithm for a given instance may also have to be determined based on various factors requiring expert level knowledge about the equipment combined with how the controls that run the equipment are configured.

Depending on the type and complexity of the equipment type, the target users having installer, maintenance and service technician user profiles may not necessarily have an ability to setup and configure such a complex system. Even if technicians are skilled, they may often be limited by the amount of time they are able to spend to configure such a system to get it to work reliably (no false alerts).

When the controllers/thermostats are installed, they may be configured and provided details about how to control the HVAC equipment. For a fixed-function controller, the configuration data may include descriptions of the types of HVAC equipment and HVAC equipment subsystems, for example, a type of cooling, a number of compressors, whether an economizer is present, and so on. The information available in the controllers may be automatically used to check the filter/trigger condition for a specific fault detection algorithm. In other words, the information that is used by the controllers to control the HVAC equipment may be used to determine which set of fault detection algorithms are relevant for that specific equipment. The general principle may be applied to other types of equipment, not just HVAC, that are controlled by an intelligent control device based on a set of configuration parameters. The parameters that are used for control may also be used to filter applicable fault detection algorithms.

A light commercial building system (LCBS) cloud system may be capable of hosting and running several different types of fault detection algorithms. The LCBS system may be targeted for HVAC equipment initially but can be expanded to other types of equipment. The algorithms may be predefined and the "trigger" conditions/rules may also be pre-defined. The trigger conditions may be defined in terms of specific "equipment configuration" point values. When the LCBS gateway detects the thermostats/controllers installed in a building, it may automatically read the configuration details from these controllers and send the information to the cloud. The cloud system may examine the controller configuration details to infer items about the HVAC equipment and then check the trigger conditions for each of the AFDs to determine whether the AFD is applicable to this instance of the controller/equipment. If the conditions are met, the cloud system may automatically start an instance of an algorithm for this controller. The algorithm may then act on the runtime/operational data from that particular controller instance. The present mechanism may significantly reduce the time required as well as the skill/experience level required to setup the system to detect HVAC and other equipment faults.

Figure 6:
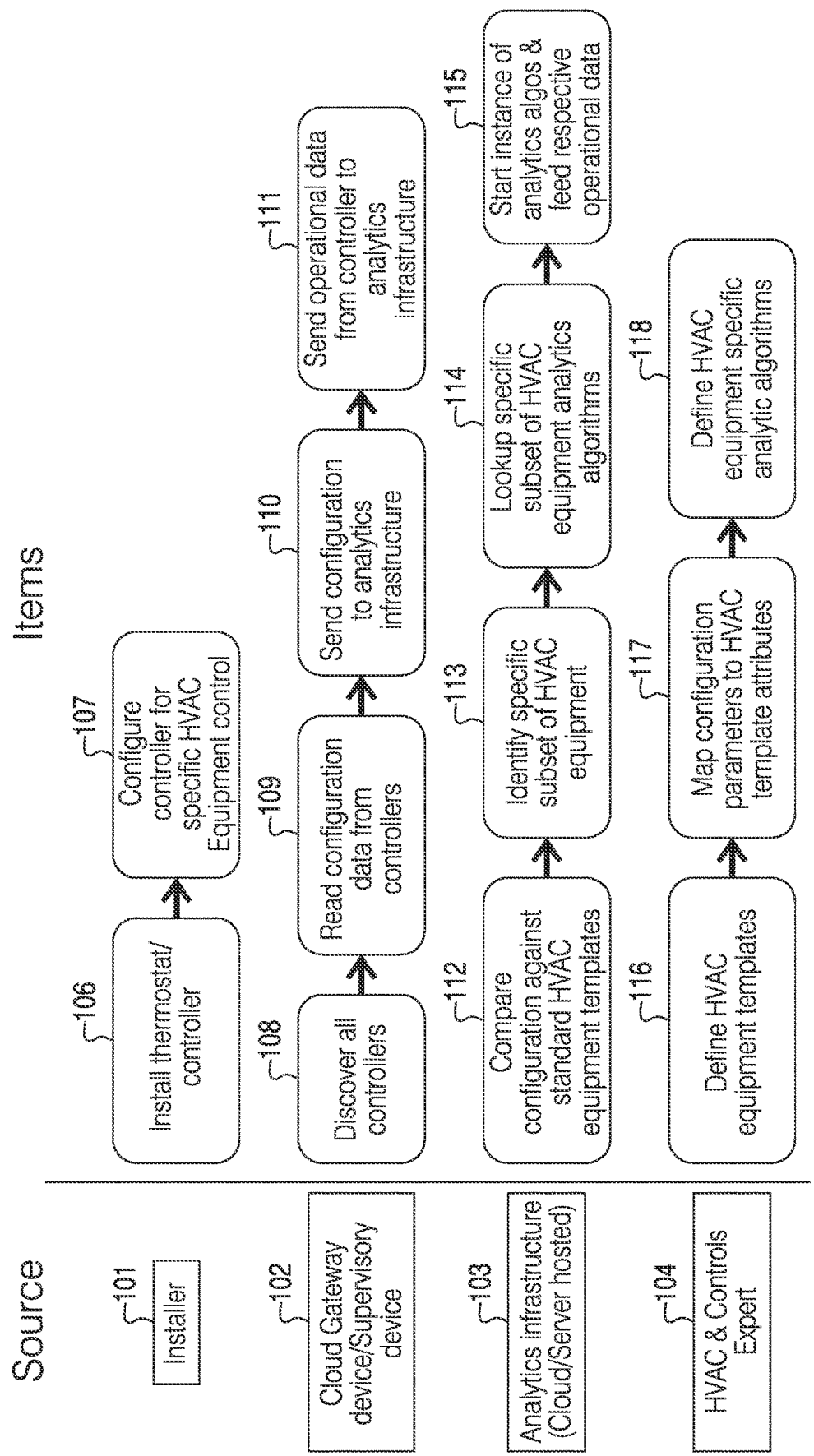
FIG. 6 is a diagram of triggering analytics by inferring details about target equipment like, for example, heating, ventilation and air conditioning equipment, from details of a controller configuration.

FIG. 6 is a diagram of triggering analytics by inferring HVAC equipment details from a controller configuration. The sources may incorporate an installer 101, a cloud gateway device/supervisory device 102, analytics infrastructure 103 (cloud/server hosted), and HVAC and controls expert 104. A thermostat/controller 106 may be installed. A controller 106 may be configured for specific HVAC equipment control at symbol 107.

Relative to device 102, virtually all controllers may be discovered at symbol 108. Configuration data at symbol 109 may be read from the controllers. The configuration as indicated by the data may be sent to an analytics infrastructure at symbol 110. The analytics infrastructure may often be hosted on a server or in the cloud. Operational data at symbol 111 may be sent to the analytics infrastructure.

Relative to the analytics infrastructure hosted by the cloud or server at symbol 103, the configuration may be compared against standard HVAC equipment templates at symbol 112. Then a specific subset of HVAC equipment may be identified at symbol 113. The specific subset of HVAC equipment analytics algorithms may be looked up at symbol 114. The following symbol 115 indicates that an instance of analytics algorithms may be started and that respective operational data may be fed.

At symbol 104, a domain expert of HVAC and controls may be involved to define the source of information that is used by the core analytics infrastructure like HVAC equipment templates may be defined at symbol 116. Then configuration parameters may be mapped to HVAC template attributes at symbol 117. At symbol 118, HVAC equipment specific analytic algorithms may be defined.

Ensuring reliability of analytics by retaining logical continuity of HVAC equipment operational data even when controllers and other parts of the system are replaced may be noted. Operational data from equipment like, for example, HVAC equipment, that are collected and stored from thermostats and controllers over a long period of time may be used to detect/predict equipment faults that manifest over a long period of time. However, such analytics of long term historical data may rely on the continuity and correctness of the data. When controllers fail and get replaced, the operational data from the new controller may get logged as a completely different data set unrelated to the data from the previous controller. However, since the data are about the operation of the same piece of HVAC equipment, this discontinuity in data logging may affect analytics that depend on historical data.

When a thermostat/controller or gateway is physically replaced in a building, the installer may be provided with simple tools/workflows that allow the installer to indicate to the system that is collecting and logging the data that the new controller is in fact a replacement and therefore the data collected by the old and the new controllers really belong to the same HVAC equipment. This approach may allow the system to automatically reconcile and merge the data set from the old controller and the new controller into one consistent series.

An LCBS cloud user interface (UI) may provide a "Replace" menu option for a gateway/controller. When the menu option is invoked for a controller, the user may be allowed to select/point to items in the controller list that refer to the old controller and the new controller. Once this is done, the cloud system may automatically remap internal point identification (ID) references and also automatically copy historical data from the old controller to the new controller to ensure continuity in the time-series data for the given HVAC equipment.

Figure 7:
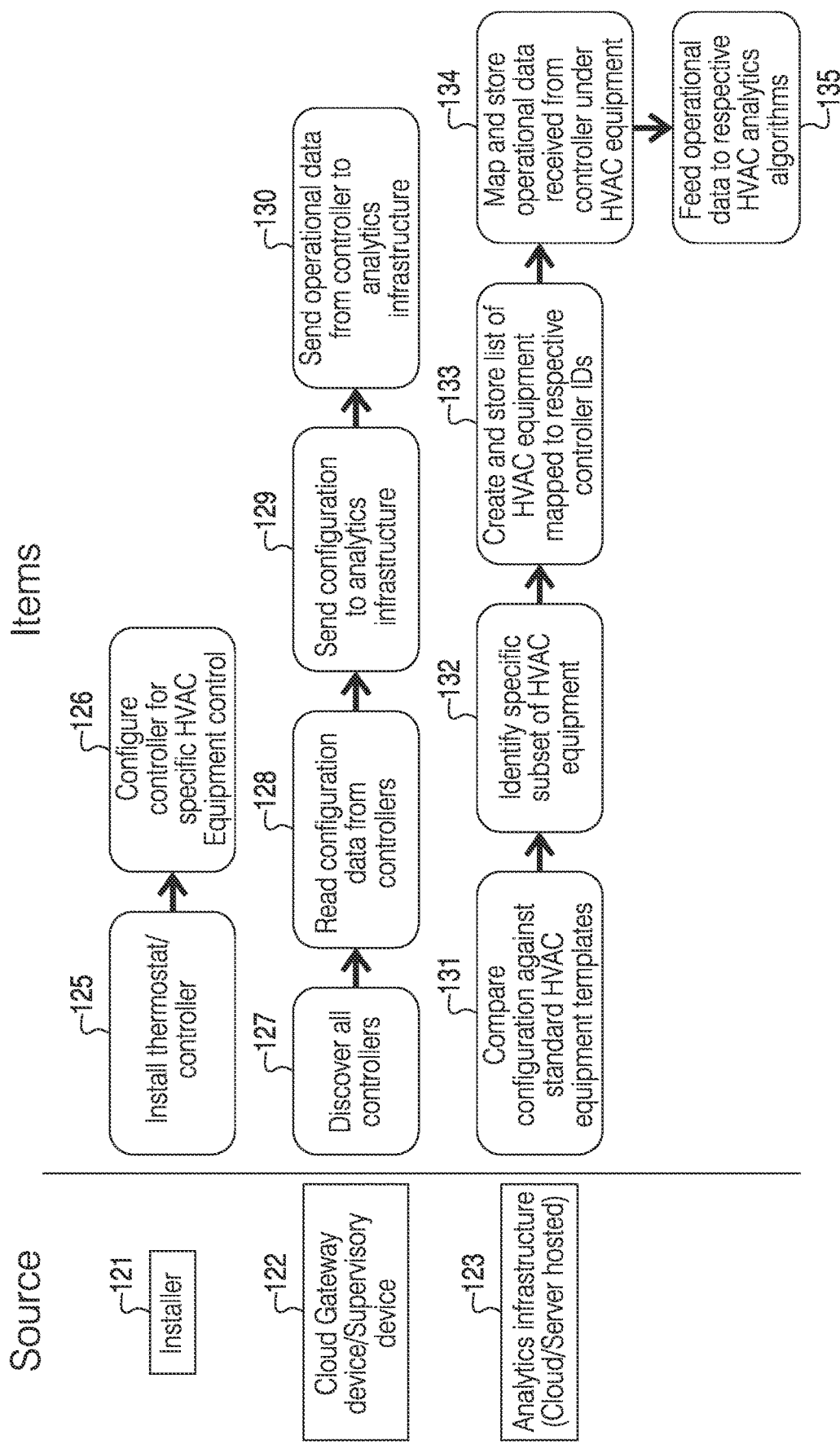
FIG. 7 and FIG. 8 are diagrams about retaining logical continuity to virtually any type of controller, such as heating, ventilation and air conditioning equipment operational data even when controllers are replaced.
Figure 8:
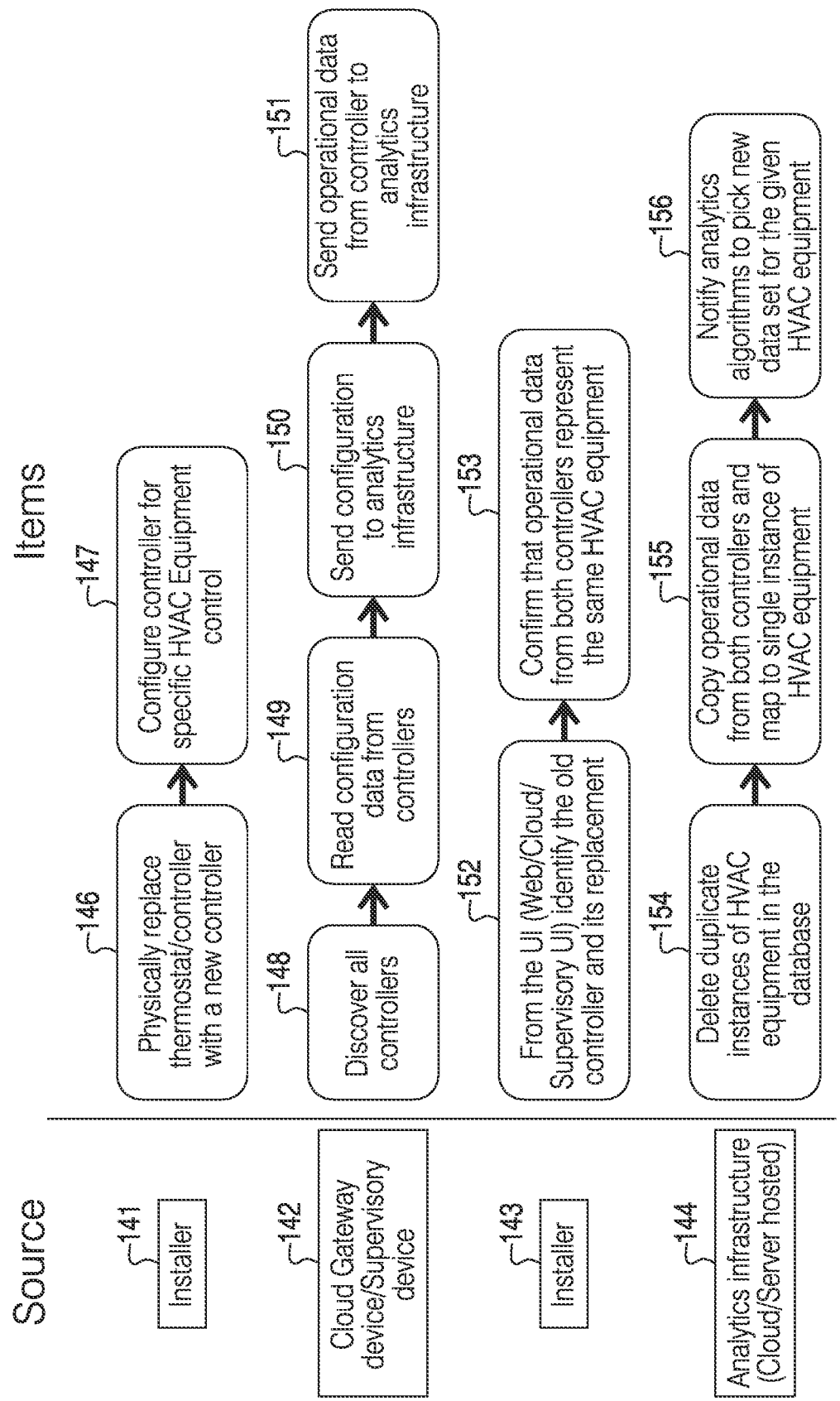

FIG. 7 and FIG. 8 are diagrams about retaining logical continuity of equipment operational data even when controllers are replaced. FIG. 7 relates to a scenario one and FIG. 8 relates to a scenario two. Scenario one reveals an initial installation of a controller. A controller ID and operational data may be automatically mapped to, for example, instances of HVAC equipment in the database used by an analytics infrastructure.

Sources may incorporate an installer 121, a cloud gateway device/supervisory device 122, and an analytics infrastructure 123 (cloud/server hosted). A thermostat/controller may be installed at symbol 125. The controller may be configured for specific HVAC equipment control at symbol 126.

At symbol 127 of source 122, all controllers may be discovered. Configuration data may be read from the controllers at symbol 128. A configuration may be sent to an analytics infrastructure at symbol 129. From a controller, operational data may be sent to the analytics infrastructure as indicated in symbol 130.

From source 123, the configuration may be compared against standard HVAC equipment templates at symbol 131. At symbol 132, a specific subset of HVAC equipment may be identified. A list of HVAC equipment mapped to respective controller IDs may be created and stored at symbol 133. Operational data received from a controller under the HVAC equipment may be mapped and stored according to symbol 134. At symbol 135, operational data may be fed to respective analytics algorithms.

Scenario two of FIG. 8 relates to replacement of a controller used for given HVAC equipment. A new controller ID and operational data from the controller may be automatically mapped to an existing instance of HVAC equipment in the database and operational data from the old controller is merged with operational data received from a new controller. Sources may incorporate installers 141 and 143, a cloud gateway device/supervisory device 142, and an analytics infrastructure 144 (cloud/server hosted). At symbol 146, a thermostat/controller may be physically replaced with a new controller. The controller may be configured for a specific HVAC equipment control according to symbol 147.

Relative to source 142, all controllers may be discovered at symbol 148. According to symbol 149, configuration data may be read from the controllers. A configuration may be sent to an analytics infrastructure at symbol 150. Operational data from the controller may be sent to the analytics infrastructure at symbol 151. As to installer 143, the old controller and its replacement may be identified from the UI (web/cloud/supervisory UI and so on) according to symbol 152. Operational data from both controllers may be confirmed to represent the same HVAC equipment, in view of symbol 153. As an alternate to manual identification and mapping of multiple controller data to the same piece of equipment, other approaches may be incorporated to accomplish this automatically. The controllers may be named in a unique manner or assigned addresses in a specific manner that will allow the system to automatically associate data from these controllers to a specific instance of HVAC equipment in the database.

At source 144 level, duplicate instances of HVAC equipment in the database may be deleted according to symbol 154. Symbol 155 indicates the operational data from both controllers may be copied and mapped to a single instance of HVAC equipment. Analytics may be notified to pick a new data set for the given HVAC equipment according to symbol 156.

Workflow and mechanisms of, for example, an LCSB gateway, may be associated to a contractor account. The process and mechanisms involved in associating an LCBS gateway that is installed in a building to the cloud-account of a user (in this case a contractor) may be noted.

Several issues may be checked. First installing and configuring devices that connect to the internet may involve multiple steps that need some amount of information technology (IT) knowledge and access to IT setup details in the facility. In a target market for LCBS, the user expected to install the gateway may not necessarily have the knowledge, or access to such information. This lack may sometimes act as a deterrent and then installers may tend to rely on somewhat more expensive high-skilled personnel to install such systems that connect to the internet/cloud.

Second, complexity may affect security and ownership of a device. The installer may be doing the job on behalf of the building owner. The installer may need to be able to finish his task with minimum dependency on building owner. This approach may demand that the installer be in control of the workflow. At the same time, the building owner may want to have the ability to switch contractors and be able to transfer control and flow of data from the gateway to a new contractor. The "transfer of gateway" to a new account should happen in a secure manner such that the previous contractor will no longer be able to access the building/gateway from his cloud account once the transfer is completed.

Several features/mechanisms may come together to address the above-mentioned issues.

An initial install approach may be noted. A gateway may be shipped with dynamic host configuration protocol (DHCP) addressing enabled by default. Therefore, when the gateway is powered up and connected to an Ethernet port, the gateway may automatically acquire an internet protocol (IP) address. The installer is not necessarily dependent on any IT knowledge to setup the device. The installer might only need to ask for a free Ethernet port to get the device to talk to a company cloud.

After successfully obtaining an IP address, the gateway may automatically connect to the company cloud to identify itself without user intervention. The gateway may be shipped with, for example, a globally unique multiple character code, or other unique designation for registration. The installer may type in, for example, a registration code under the installer's cloud account to associate the gateway to the installer's account.

Transferring the gateway to a different contractor's account may be noted. When the new contractor attempts to add a gateway to his cloud account, after entering the registration ID, the contractor may be challenged to prove ownership/physical access to the building. To support this, the gateway may be shipped with a push button that is expected to be pushed as part of the workflow to transfer the gateway to a different account. The push-button press may be valid/honored only when it is done as part of this workflow. The push button press may be ignored by the system in all other situations. This may be to ensure that no one other than a contractor/building owner, who has physical access to the gateway, can transfer the gateway to a different account such as a cloud account.

FIG. 9 and FIG. 10 are diagrams that relate to registering a gateway with a building account. FIG. 9 pertains to a scenario one involving first-time registration of a gateway to a building account. Sources may incorporate an installer 161, a LCBS gateway 162, an installer 163, and an LCBS cloud application 164. At an installer 161 level, a gateway may be installed and connected to an internet in view of symbol 166. The gateway may be powered-up at symbol 167. LCBS components may be regarded for a purpose of illustrative examples.

A source level having an LCBS gateway 162, an IP address may be acquired through DHCP, at symbol 168. Authentication may be achieved with a cloud application with a secret ID according to symbol 169. At symbol 170, continuously (e.g., every 30 seconds), a registration ID may be sent to a cloud until mapped to a building account.

An installer 163 of the source, may create a building account from an LCBS web-UI (user interface), in view of symbol 171. A gateway registration ID may be added under the building account, at symbol 172. A LCBS cloud application 164, at a source level, may indicate at symbol 173 to verify whether a registration ID entered by a user is valid. Then a database may be updated to map the gateway to a given building account, at symbol 174. In view of symbol 175, upon a subsequent request from the gateway, credentials relevant to the building account may be provided to the gateway.

FIG. 10 pertains to a scenario two involving moving a gateway from one building account to another account. Sources may incorporate an installer 181, an LCBS cloud application 182, an installer 183, an LCBS gateway 184, and an LCBS cloud application 185. In view of symbol 186, a new building account may be created from the LCBS web-UI. A gateway registration ID may be added under the building account, at symbol 187.

Going to a source level, with an LCBS cloud application 182, whether the registration ID entered by a user and is already mapped to a different building may be verified in view of symbol 188. At symbol 189, the user may be prompted to push a button on the gateway to prove ownership. One may wait, for example, five minutes, to receive a push button command from the gateway, according to symbol 190. Installer 183 of the source level may push the re-register button on the gateway, at symbol 191. The button press may be verified using LEDs on the gateway in light of symbol 192.

Relative to the LCBS gateway 184 of the source level, authentication with a cloud application may be achieved with a secret ID, according to symbol 193. At symbol 194, a push button message may be sent to a cloud along with a registration ID.

An LCBS cloud application 185 of the source level, whether a registration ID received in a push button message matches the registration ID entered by a user may be verified in view of symbol 195. A mapping of the gateway from the old building and a re-map to a new building in the database, may be achieved according to symbol 196. The user may be notified about a successful mapping of the gateway to the building account according to symbol 197.

To recap, a notification system may incorporate a sensor that detects one or more events of equipment, and a report mechanism that provides an alert of the one or more events. The event may indicate a crossing of a threshold. The crossing of the threshold may be a value exceeding a pre-determined bound. The event may be logged upon an occurrence along with the value of an object to which the threshold is applied. If the value of the object recedes from the threshold, the alert may remain. If the value of the object again exceeds the threshold, the alert may remain and a latest time that the value of the object has exceeded the threshold may be logged.

The alert may have a priority selected from a group incorporating a plurality of priorities. Each priority may indicate a level of urgency for an action relative to the object that should be taken.

The alert may be configured to appear on a page of a display or dashboard selected from a group incorporating a pad, notebook, tablet, smartphone, laptop, and office computer.

The alert may trigger a push notification. Content of the push notification may indicate a recipient of the alert and a mode of delivery to the recipient.

The alert may incorporate a record of the event that the threshold has been crossed. The record of the event may remain if the crossing of the threshold has become absent.

One or more additional alerts may be set for one or more additional thresholds, respectively, relative to one object based on values of the object.

Each of the various thresholds may incorporate a predetermined value at which an object crosses a threshold to indicate an alert having a unique priority, in view of priorities of other alerts set for different thresholds.

Whether an alert triggers a push notification may be an option that is selected according to a value of a threshold that is crossed.

If a value of an object that crossed a threshold to generate an alert, crosses back across the threshold to a value insufficient to generate an alert, and re-crosses the threshold, then another event may be time-stamped and logged, but only one alert will remain for that threshold.

A user may ordinarily see just the one alert on a display but can look at a log of one or more events reflecting crossings of the threshold by the value of the object.

The event may be a result of a complex calculation of parameters of the equipment.

An approach of alerting may incorporate reporting an event record of equipment as an alert, logging in the alert when the alert occurs, classifying the alert as having a level of priority selected from a group of priorities, and configuring the alert to appear on a display or dashboard.

An event record as an alert may be selected from a group incorporating a sensed value of an object, going outside a predetermined bound, and an analytic value exceeding a predetermined bound. The alert may pertain to a status of the equipment in a building management system, as determined by a value of an object to which an alert threshold has been applied according to the predetermined bound.

Each of the group of priorities may incorporate a different requirement for a responsive action relative to a cause of the alert.

An alert may trigger a push notification. The push notification may incorporate content about the alert of who is to receive information pertaining to the alert, and a medium for conveying the alert.

Two or more alerts with different thresholds may be set on the same object. The two or more alerts may be set at different thresholds according to predetermined bounds, respectively.

A first threshold for a first alert of the two or more alerts may be set for a first value of the object. A second threshold for a second alert of two or more alerts may be set for a second value of the object. The first alert may be classified as low priority. The second alert may be classified as high priority. The first and second alerts may be progressive with the first alert being an early warning of the second alert.

A simple alerting service mechanism may incorporate an indication device, a processor connected to the indication device, and a sensor arrangement connected to the processor. The sensor arrangement may obtain one or more parameter values of an object of building equipment. A predetermined threshold may be applied to the one or more parameter values. If a value of the one or more parameter values crosses the threshold, then an event record of the value that crosses the threshold may be sent by the sensor arrangement to the processor. The processor may provide an alert of the event record to the indication device. The alert may be classified with a priority level that indicates an urgency level of attention required for the object.

The indication device or processor may be selected from a group incorporating a pad, notebook, tablet, smartphone, laptop and office computer.

A push notification may be triggered by the alert. The push notification may provide information that is tailored to the event record.

If the value of the one or more parameter values crosses the threshold back to an un-alert position relative to the threshold, then an un-alert of the object may be provided to the processor. If the value of the one or more parameter values re-crosses the threshold, then another event record of the value may be sent to the processor. The processor may provide the same alert for another event record to the indication device but may update a time stamp of a most recent event record. Virtually all events may be recorded in a log that is optionally viewable.

The mechanism may further incorporate a cloud. The cloud may incorporate the processor.

To recap, a system having adjustable gateway poll rates, may incorporate a mechanism that provides a role-based gateway function or an external gateway device that allows for applications registering with the gateway to dynamically specify a subset group of synchronized data objects needed by the applications and specify a data rate. A subscription of each application may have a message and a destination. The gateway may accept formalized predefined role subscriptions and custom role subscriptions.

The destination may be a common destination.

The destination may be a cloud.

The common destination may be directed to a plurality of devices within the common destination.

The subscription of each application may obtain updates from a data object to meet specific needs.

The mechanism may publish a data model of information that the mechanism can access, and publish an available update resolution.

The formalized predefined role subscriptions may be for common types of applications that need unique data objects and rates for their services. The custom role subscriptions applications may be for applications of an uncommon type.

A formalized predefined role for the predefined role subscriptions may be selected from a group incorporating system commissioning status viewing, energy analyses data logging, an equipment fault detection and diagnostic (FDD) analytic engine, and maintenance trend logging, among other roles.

A subscription that is transparent may be active just when the subscription is needed.

An approach of adjusting gateway poll rates may incorporate registering one or more applications with a gateway that dynamically specify a subset group of synchronized data objects that the applications need, and that dynamically specify the rate of the subset group of the synchronized data objects, and allowing one or more applications to subscribe to a message, a destination, and updates from a data object to meet specific needs of the one or more applications.

The gateway may accept formalized predefined role subscriptions and custom role applications. Predefined role subscriptions may be for common application types that need unique data objects and rates for their services.

Transient subscriptions may be active just when needed.

A transient subscription may be applicable to commissioning a system that requires much data at high data rates for just a subset of specific devices for a short period of time, and infrequently in a lifetime of the system.

A subscription of a different role may use some of the same data as the system that requires much data at high data rates but is temporarily created for a low data rate.

A subscription of a different role may use some of the same data as the system that temporarily requires much data at high data rates but is created for a low data rate.

An adjustable gateway may incorporate a device that permits registration of an application to dynamically specify a subset group of synchronized data objects and a rate. The device may accept formalized predefined role subscriptions and custom role subscriptions. The predefined role subscriptions may be for applications of a first type. The custom role subscriptions may be for applications of a second type.

Applications of the first type may be applications of a common type. Applications of the second type may be applications of an uncommon type.

Each subscription may have a message and a destination.

The destination may be different from other destinations or may be a common destination. If the destination is a common destination, then the subscription may be directed to different services within the destination.

The common destination may be a cloud. A subscription may be transient in that the subscription is active just when needed.

To recap, a space comfort control detector for a heating or cooling system, may incorporate a heating or cooling system for a space, a set point device connected to the heating or cooling system that allows changing a set point, a temperature indicator situated in the space, and a controller connected to the heating or cooling system, the set point device, and the temperature indicator. A controlled variable may be a space temperature indicated by the temperature indicator. A temperature set point may be unchanged if the proportional error has attained a value less than X since a last set point change. A difference between a set point and the controlled variable may be a proportional error as determined by the controller. A derivative of the proportional error may be indicated by the controller. If the proportional error is equal to or less than X, then space comfort control of the space may be satisfactory. If the proportional error is greater than X, and the derivative is greater than Y1, then space comfort control of the space may be unsatisfactory and an alert may be provided by the controller.

If the set point has been changed and the proportional error is calculated based on an active set point derived from a recovery rate R (degrees per hour) by ramping at recovery rate R from a previous set point to a present set point, and if the proportional error is greater than X but the derivative is less than Y2 for a time equal to or greater than Z, then comfort control of the space may have been retained or not necessarily have been lost.

If the proportional error is greater than X, and the derivative is greater than Y continuously for a time Z, then the space may become noticeably uncomfortable to an occupant of the space.

The heating or cooling system may be rated to operate at a normal capacity. The set point may be represented by an active set point being calculated from a ramp rate S from a previous set point and a new set point because of a set point change. If the proportional error is greater than X for the time associated with the active set point to ramp at ramp rate S from the previous set point to a present set point, then the heating or cooling system may be operating at less than normal capacity.

If a rate of change of the proportional error increases beyond Y1 while the proportional error increases to greater than X, then an alert may be provided by the controller.

A derivative of proportional error may be a rate of change of the difference between the set point and the controlled variable. A filter may be used to reduce noise of the derivative of the proportional error and improve an accuracy of determinations dependent on the derivative.

X, Y, Y1, Y2 and Z may be numerical values.

An approach for detecting a loss of space comfort control, may incorporate observing a proportional error, which is a difference between a set point and a controlled variable, of a heating or cooling system, that represents an amount of comfort control output, and checking the proportional error as to whether the proportional error is larger than a number D predetermined for the heating or cooling system at a steady state, but smaller than a number E predetermined to be noticeably uncomfortable for the heating or cooling system at the steady state.

D and E may be numerical values.

At a time of the observing and the checking the proportional error, there may be an absence of a recovery state from a set point change.

At the time of the observing and checking the proportional error, if the proportional error is a number greater of a number predetermined as within comfort control but smaller than a number E predetermined to be beyond comfort control, and a rate of change of the proportional error being larger than the number D predetermined during a steady state of the heating or cooling system needed to maintain control, then an alert indicating a loss of space comfort control may be triggered.

Noise on the proportional error may be filtered out.

The heating or cooling system may incorporate a heating, ventilation and air conditioning (HVAC) system.

A mechanism for monitoring comfort control in a space, may incorporate a heating or cooling system having one or more heating or cooling vents, respectively, connected to a space, and a thermostat connected to the heating or cooling system. The thermostat may incorporate a processor connected to the heating or cooling system, an indicator of space temperature connected to the processor, and a device for set point temperature connected to the processor. Proportional error may be a difference between a set point temperature and space temperature. The processor may calculate an active set point that follows a ramp from a previous set point to a new set point when a set point has been changed. The processor may periodically sample the proportional error by reading the space temperature and the set point temperature and calculate a derivative of the proportional error. A derivative of proportional error may be observed to at least partially monitor comfort control in the space.

A loss of comfort control may be determined by a proportional error that is greater than a predetermined number A for steady state control but less than a predetermined number B for noticeable discomfort.

A and B may be numerical values.

The heating or cooling system may not necessarily be in a recovery state from a set point change.

If the proportional error is outside of limits where the proportional error is less than a predetermined number X for control at steady state but greater than a predetermined number Y for an expectation of noticeable discomfort, the heating or cooling system is not recovering from a set point change, and the rate of change of the proportional error will not result in the proportional error to be within the limits here, then an alert may indicate a loss of comfort control in the space.

X and Y may be numerical values.

If the signal representing the proportional error has noise, then the signal may be filtered to improve an accuracy of the proportional error.

The heating or cooling system may incorporate a heating ventilation and air conditioning (HVAC) system.

If the signal representing a derivative of the proportional error has noise, then the signal may be filtered to improve an accuracy of the proportional error as implemented as logic in the processor.

If the signal representing a derivative of the proportional error has noise, then the signal may be filtered to improve an accuracy of the derivative. Filtering of the derivative may be implemented as logic in a cloud.

If the signal representing the proportional error has noise, then the signal may be filtered to improve accuracy of the proportional error. The filter may be implemented in a local server or controller that controls the heating or cooling system for the space.

To recap, a heating, ventilation and air conditioning (HVAC) system capacity determining mechanism may incorporate an outdoor thermometer, an occupancy profile indicator of a space where an HVAC system provides heating, ventilation and air conditioning, a relative degree days indicator for a location of the space, a set point indicator of a thermostat connected to the HVAC system, a runtime instrument for measuring accumulated runtime of the HVAC system, a HVAC system capacity calculator connected to the set point indicator, the outdoor thermometer, the runtime instrument, the occupancy profile indicator, and the relative degree days indicator to determine an effective capacity ratio, and an alert indicator connected to the capacity calculator.

The HVAC capacity calculator may output a number of relative degree days for the space.

HVAC capacity may be indicated by the number of relative degree days divided by the accumulated runtime.

The alert indicator may provide a warning when there is a change in HVAC capacity.

A previous effective capacity ratio may be relative degree days for a specified time interval, divided by an accumulated stage run for the specified time interval, that can be a reference for a subsequent effective capacity ratio having the same degree days for a time interval that is virtually equal to the specified time interval.

The previous effective capacity ratio and the subsequent effective capacity ratio may have equivalent occupancy profiles and equivalent setpoint profiles.

An approach for setting a capacity loss alert, may incorporate calculating an effective capacity ratio, determining that a clear reference flag is set, determining whether the last specified interval set point schedule profile matches a set point profile of a reference, comparing the effective capacity ratio to a reference ratio to determine whether the ratio is less than X percent of the reference ratio, setting a loss of capacity alert if the ratio is equal to or greater than X percent of the reference ratio, and X is a predetermined number.

The effective capacity ratio may be relative degree days for a last specified time interval divided by an accumulated stage run time for the same specified time interval.

If the clear reference flag is set because of a service or repair performed, then a set point schedule reference log may be cleared.

The approach may further incorporate logging a new set point schedule reference if a last specified time interval set point matches a reference.

The effective capacity ratio may be compared to a reference ratio.

A question may be whether the effective capacity ratio is less than X percent of the reference ratio. X may be a pre-determined number between zero and one hundred.

When the effective capacity ratio is less than X percent of the reference ratio, then an alert of loss of capacity may be provided via a visual or audio signal to a user or operator.

A HVAC capacity loss alert system may incorporate a recorder of relative degree time units, and a recorder of adjusted equipment run time. A relative degree time unit may be a result of a calculation that integrates a difference in outdoor air temperature from current set points for a time unit. An effective capacity ratio of relative degree time units for a duration to the adjusted equipment run time may be made, when effective occupied profiles match.

A time unit may be a day.

Relative degree days may be integrated across a time frame that provides a similar load profile based on occupancy patterns and indexed to the occupancy profiles.

The difference in outdoor air temperature from a current set point may be integrated periodically every X seconds.

X may be a number.

When similar occupancy and set point profiles are detected, then the effective capacity ratio of relative degree days to the adjusted equipment run time may be determined.

The effective capacity ratio may represent an amount of effort that equipment uses to regulate a normalized load. A profile may contain set point schedules for occupancy and non-occupancy.

A reference ratio may be established to represent an amount of effort that the equipment is expected to use to regulate a normalized load. The effective capacity ratio may be compared with the reference ratio. If the effective capacity ratio is at least X percent less than the reference ratio, then a loss of capacity alert may be set.

The reference ratio may be established from a previous effective capacity ratio. The effective capacity ratio may be compared with the reference ratio. If the effective capacity ratio is at least Y percent less than the reference ratio, then a loss of capacity alert may be set.

X and Y may be numbers.

To recap, a heat exchanger capacity change detection system may incorporate a first temperature detector situated at an air intake of a heat exchanger, a second temperature detector situated at an air discharge of the heat exchanger, and a processor connected to the first and second temperature detectors. The first temperature detector may provide an intake air temperature signal to the processor. The second temperature detector may provide a discharge air temperature signal to the processor. The processor may provide a delta temperature indication that is a difference between an intake air temperature and a discharge air temperature of the heat exchanger. The processor may provide a derivative of the delta temperature indication. The derivative of the delta temperature indication may indicate a steady state condition has been reached from system changes that affect a delta temperature. When the trend change occurs, a change in the delta temperature may represent a change of heating or cooling capacity of the heat exchanger provided that the operational properties of the heat exchanger remain constant.

An intake air temperature and a discharge air temperature may be dry bulb temperatures of air.

An operational property is one that may vary to change a capacity of the heat exchanger that does degrade a capacity of the heat exchanger.

The operational properties may be at least one or more items selected from a group incorporating a number of active stages, air flow rate, outdoor dry bulb temperature, mixed air wet bulb temperature, and mixed air dry bulb temperature.

The system may further incorporate a change of capacity alert device connected to the processor.

If the measured delta temperature is at least N percent different from an expected delta temperature, then the alert device may indicate that the heat exchanger has a change of capacity. N may be a predetermined number.

An approach for determining a change of capacity of a heating or cooling system, may incorporate determining a commanded capacity of the heating or cooling system that remains the same, measuring a first temperature of an air input to the heating or cooling system, measuring a second temperature of an air output of the heating or cooling system, determining a delta temperature from a difference of the first temperature and the second temperature, and calculating a derivative of the delta temperature. If the derivative of the delta temperature is within D of zero, then the delta temperature may have reached a steady state and may be valid for capacity comparisons. If delta temperature has decreased from a previously recorded value, then this decrease may represent a loss of capacity. D may be a predetermined number.

The heating or cooling system may have operational properties. The operational properties may have parameter values that remain constant when the first and second temperatures are measured, and the delta temperature may be determined from the first and second temperatures.

The operational properties may be at least one or more items selected from a group incorporating a number of active stages, air flow rate, outdoor dry bulb temperature, mixed air wet bulb temperature, and mixed air dry bulb temperature. When the operational properties change, they may cause a change in capacity without degradation of capacity of the heating or cooling system.

The first temperature and the second temperature detectors may measure dry bulb temperatures of air.

The approach may further incorporate providing a warning alert if the change of the delta temperature from a previously recorded reading exceeds a predetermined value indicated by N, that indicates a decrease in capacity of the heating or cooling system. N may be a number.

The measuring of a first temperature may be achieved from a first sensor situated at the air input. The measuring of a second temperature may be achieved from a second sensor situated in the air output. The determining the delta temperature may be provided by a processor connected to the first and second sensors. The calculating the derivative of the delta temperature may be with the processor.

The processor may provide an alert that warns of a decrease in capacity of X or more percent of a predetermined reference capacity of the heating or cooling system. X may be a predetermined number.

Upon starting the heating or cooling system, the first temperature and the second temperature may have a delta temperature that becomes constant in value when reaching a time T, however time T can vary from system to system and also within the same system depending on operational and environmental factors. A derivative of the delta temperature may be calculated to determine when the delta temperature is constant in that it has reached a steady state. If the derivative of delta temperature is less than a value N, then the heating or cooling system may be deemed to be operating at a steady state for a current mode of the system. If a steady state delta temperature for a particular mode is less than P percent of a previously recorded reference value, then the heating or cooling system may be deemed to be operating at less than full capacity.

If the delta temperature changes in value of N percent after a time T, then an alert may be provided indicating that the heating or cooling system is operating at a capacity less than the full capacity. N, P and T may be predetermined numbers.

An alerting mechanism relative to a capacity change of a heating or cooling system, may incorporate a first temperature sensor at an air input of a heat or cooling system, a second temperature sensor at an air output of a heat or cooling system, and a processor connected to the first temperature sensor and the second temperature sensor. The processor may determine a delta temperature between a first temperature indicated by the first temperature sensor and a second temperature indicated by the second temperature sensor. The processor may calculate a derivative of the delta temperature. A derivative of the delta temperature may be calculated and may be a value indicating delta temperature has reached steady state. Operational properties of the heating or cooling system that when changed may affect the delta temperature without a degradation of a capacity of the heating or cooling system, may be kept constant.

If a value of a steady state delta temperature is the same as a previously recorded reference, then a change in capacity of the heating or cooling system may be zero.

A value of a steady state delta temperature less than a previously recorded reference, may indicate a change in the capacity of the heating or cooling system.

If the capacity of the heating system has decreased according to the derivative of the delta temperature, then an amount of a decrease of capacity may be determined by a magnitude of the value of the derivative of delta temperature.

If a decrease of capacity is at least X percent, then an alert may be provided by the processor. X may be a predetermined number.

To recap, a system with analytics may incorporate a controller, and equipment. The equipment may be selected from a group comprising heat exchangers, heating or cooling systems, HVAC, fire, security, lighting, video, air control, and audio systems. An illustrative example HVAC equipment for illustrative purposes may be selected. The controller may have configuration data about the HVAC equipment. The configuration data may incorporate descriptions about types of the HVAC equipment and subsystems of the HVAC equipment. The configuration data may be used by the system to determine which fault detection algorithms are relevant to the types of HVAC equipment and the subsystems of HVAC equipment.

The system may further incorporate a cloud system connected to the controller. The cloud system may provide the fault detection algorithms relevant to the types of HVAC equipment and the subsystems of HVAC equipment.

The fault detection algorithms may incorporate pre-defined trigger conditions. If the trigger conditions are met of a fault detection algorithm for one or more types of the HVAC equipment and subsystems of the HVAC equipment, then the cloud system may automatically start the fault detection algorithm for the one or more types of the HVAC equipment and subsystems of the HVAC equipment.

The fault detection algorithm may then act on runtime and operational data from the one or more types of the HVAC equipment and subsystems of the HVAC equipment.

An approach for triggering analytics may incorporate configuring a thermostat for control of a specific heating or cooling equipment, triggering analytics by inference of details of the specific heating or cooling equipment from a configuration of the thermostat, discovering virtually all controllers for specific heating or cooling equipment, and reading configuration data pertinent to heating or cooling equipment from the controllers.

Discovering the controllers may be performed with a cloud gateway device.

The approach may further incorporate deriving a configuration from the configuration data, sending the configuration to an analytics infrastructure device, and sending operational data from the thermostat to the analytics infrastructure device.

The approach may further incorporate a gateway using a pre-defined template of a controller to automatically identify a list of configuration and operation points to be read from the controller.

The approach may further incorporate comparing the configuration against standard heating or cooling equipment templates.

The approach may further incorporate identifying a specific subset of the heating or cooling equipment, and looking up analytics algorithms for the specific subset of the heating or cooling equipment.

The approach may further incorporate starting an instance of the analytics algorithms, and feeding respective operational data to the analytics algorithms.

The approach may further incorporate defining templates for the heating or cooling equipment.

The approach may further incorporate mapping configuration parameters to attributes of the templates for the heating or cooling equipment, and defining analytic algorithms for the specific heating or cooling equipment from the templates for the heating or cooling equipment.

The thermostat, the heating or cooling equipment, and the controllers may be of a light commercial building system (LCBS).

A system for inferring, for an illustrative example of HVAC equipment, HVAC equipment details from a controller configuration, may incorporate an HVAC controller, and specific HVAC equipment connected to the HVAC controller. The HVAC controller may be configured for control of the specific HVAC equipment.

The system may further incorporate a cloud gateway device. The cloud gateway device may discover virtually all controllers. Configuration data about the specific HVAC equipment may be read from the controllers using pre-defined templates that are present in the cloud gateway device.

Pre-defined templates used by the cloud gateway device to decide the set of configuration and operational data to be read from the controllers may be provided to the cloud gateway device from a cloud or analytics infrastructure.

The system may further incorporate an analytics infrastructure device. The configuration data may be read from the controllers discovered by the cloud gateway device, and sent as a configuration to the analytics infrastructure device. Operational data from the HVAC controller may be sent to the analytics infrastructure device.

The analytics infrastructure device may be cloud/server hosted. The configuration may be compared against standard HVAC equipment templates to identify a specific subset of HVAC equipment.

Analytics algorithms for the specific subset of HVAC equipment may be looked up with the analytics infrastructure device. An instance of the analytics algorithms may be started. Operational data respective to the specific subset of the HVAC equipment may be fed to the instance of the analytics algorithms. HVAC equipment templates may be defined. Configuration parameters may be mapped to attributes of the HVAC equipment templates. Analytic algorithms specific to the HVAC equipment may be defined.

To recap, an equipment continuity system may incorporate heating or cooling equipment, a first controller connected to the heating or cooling equipment, and a recorder connected to the first controller. The recorder may receive and log data from the first controller. The first controller may be replaceable with a second controller. If the first controller is replaced with the second controller, the recorder may receive and log data from the second controller. The data from the second controller may be merged with the data from the first controller.

A merging of data from the first controller and the second controller into one series of data may be done automatically to ensure continuity of data for the heating or cooling equipment.

A merging of the data from the first and second controllers may be automatic on a cloud connected to the first and second controllers in that order.

An approach for retaining continuity of operational data of equipment, may incorporate installing a first controller, configuring the first controller for control of specific equipment, replacing the first controller with a second controller, and configuring the second controller for controlling the specific equipment. An illustrative example of equipment may be HVAC equipment and specific HVAC equipment.

The approach may further incorporate identifying the first controller and the second controller.

The identifying the first and second controllers may be performed with a user interface on a web, cloud or supervisory device.

The approach may further incorporate identifying and mapping the first and second controllers. The identifying and mapping of the first and second controllers may be done using a unique naming or addressing scheme in the controllers.

The approach may further incorporate confirming that operational data from the first and second controllers represent the same specific HVAC equipment.

The approach may further incorporate deleting duplicate instances of the specific HVAC equipment in a database common to the first and second controllers.

The approach may further incorporate copying data from the first and second controllers to a single instance of the specific HVAC equipment, and notifying analytics algorithms to obtain a new data set for the specific HVAC equipment.

A new ID and operational data of the second controller may be automatically mapped to the specific HVAC equipment.

Operational data from the first controller may be merged with operational data from the second controller.

A system for inferring equipment details from controller configuration details, may incorporate a thermostat/controller, and specific heating or cooling equipment. The thermostat/controller may configured for the specific heating or cooling equipment control.

The system may further incorporate a cloud gateway device. Virtually all controllers may be discovered. Configuration data may be read from the controllers.

The system may further incorporate an analytics infrastructure device. The configuration data read from the controllers may be sent to the analytics infrastructure device. Operational data may be read from the controller to the analytics infrastructure device.

The system may further incorporate an analytics infrastructure cloud/server hosted. The configuration may be compared against standard HVAC equipment templates. A specific subset of heating or cooling equipment may be identified.

A list of heating or cooling equipment mapped to respective controller IDs may be created and stored. Operational data received from a controller under heating or cooling equipment may be mapped and stored. The operational data may be fed to respective analytics algorithms.

An old controller, and a new controller replacing he old controller may be identified from a user interface. Operational data from the old controller and operational data from the new controller may represent the same heating or cooling equipment.

Duplicate instances of HVAC equipment in a database may be deleted. Operational data from the old controller and the new controller may be copied and mapped to a single instance of heating or cooling equipment.

Analytic algorithms may be notified to pick a new data set for a given heating or cooling equipment.

To recap, a system that registers a gateway with a building account, may incorporate a gateway, and an internet connected to the gateway. An internet protocol (IP) address for the gateway may be acquired for the gateway through dynamic host configuration protocol (DHCP). The gateway may be authenticated with a cloud application with a secret identification (ID). A registration ID may be continuously sent to a cloud until mapped to a building account.

A building account may be created from a web user interface. The registration ID may be added under the building account.

The registration ID entered by a user may be verified for validity. A database may be updated to map the gateway to a given building account.

On a subsequent request from the gateway, credentials relevant to the building account may be provided to the gateway.

Whether a registration ID entered by a user is already mapped to a different building may be verified.

The user may be prompted to push a button on the gateway to prove ownership. The cloud application may wait for a period of time to receive a push button command from the gateway.

The user may pushes a re-register button on the gateway. A button press may be verified using light sources on the gateway.

Registration may be authenticated with a cloud application with a secret ID. A push button message may be sent to a cloud along with a registration ID.

Whether the registration ID received in the push button message matches the registration ID entered by the user, may be verified.

The mapping of the gateway of an old building may be removed and re-mapped to a new building in the database.

The user may be notified about a successful mapping of the gateway to a building account.

An approach for registering a gateway, may incorporate connecting a gateway to an internet and acquiring an IP address, obtaining a registration ID, creating a first building account from a user interface of the internet, and entering the registration ID under the first building account.

The approach may further incorporate creating a second building account from a user interface of the internet, and entering the registration ID under the second building account.

The approach may further incorporate verifying that the registration ID is mapped to the second building.

The approach may further incorporate pushing a button on the gateway to prove ownership, receiving a push button command from the gateway, pushing a re-register button on the gateway, verifying a button pressing with a light on the gateway, authenticating registration with a secret ID, and sending a push button message along with the registration ID.

The approach may further incorporate removing a mapping of the gateway from the first building account, and mapping the gateway to the second building account.

The approach may further incorporate notifying a user about a successful mapping of the gateway to the second building account.

A structure having a gateway may incorporate one or more protocol translators, and a mechanism with DHCP addressing connected to the one or more protocol translators. When the gateway is powered up and connected to a net port, the gateway may automatically acquire an IP address. After acquiring an IP address, the gateway may automatically connect to a designated cloud and identify itself. The gateway may be shipped with a registration code.

One may type in a code under its cloud entry. Upon entering the registration code, one may associate the gateway to one's account.

When a new person attempts to add the gateway to its account, after entering the registration code, the person may be challenged to prove access. The gateway may have a push button to be pressed for transfer of the gateway to a different account as part of a workflow. The push button press may be valid only when performed as part of the workflow, to ensure that just the person who has access to the gateway can transfer the gateway to its account.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A thermostat comprising:
   a processor configured to connect to one or both of a heating system and a cooling system;
   a sensor in communication with the processor, the sensor is configured to sense a temperature; and
   a component for setting a setpoint temperature for the one or both of the heating system and the cooling system, and
   wherein the processor is configured to:
   control the one or both of the heating system and the cooling system to achieve the setpoint temperature;
   sample differences between the sensed temperature and the setpoint temperature over time;
   determine when a difference in the differences between the sensed temperature and the setpoint temperature sampled over time goes beyond a threshold value;
   in response to determining the difference is beyond the threshold value, determine a rate of change of the sampled differences between the sensed temperature and the setpoint temperature over time; and
   when the one or both of the heating system and the cooling system is not in a recovery mode, determine when a loss of comfort control exists based on whether the rate of change over time of the differences between the sensed temperature and the setpoint temperature indicates the sensed temperature will not arrive at a desired temperature within a first set amount of time; and
   when the one or both of the heating system and the cooling system is in a recovery mode, determine when a loss of comfort control exists based on whether the rate of change over time of the differences between the sensed temperature and the setpoint temperature indicates the sensed temperature will not arrive at a desired temperature within a second set amount of time.

2. The thermostat of claim 1, wherein the processor is configured determine when the loss of comfort control exists based on the rate of change of the differences between the sensed temperature and the setpoint temperature and whether a predetermined amount of time has elapsed.

3. The thermostat of claim 1, wherein the processor is configured to compare the rate of change of the differences between the sensed temperature and the setpoint temperature to a rate of change threshold value.

4. The thermostat of claim 3, wherein the processor is configured to:

determine whether a predetermined amount of time has elapsed; and determine when the loss of comfort control exists based on whether the predetermined amount of time has elapsed and the rate of change of the differences between the sensed temperature and the setpoint temperature.

5. The thermostat of claim 1, wherein the processor is configured to determine whether the one or both of the heating system and the cooling system are in the recovery mode.

6. The thermostat of claim 5, wherein the processor is configured to determine whether the one or both of the heating system and the cooling system are in the recovery mode based on a value resulting from multiplying the differences between the sensed temperature and the setpoint temperature by a recovery rate.

7. The thermostat of claim 5, wherein the processor is configured to:
compare the rate of change of the differences between the sensed temperature and the setpoint temperature to a first threshold; and
compare the rate of change of the differences between the sensed temperature and the setpoint temperature to a second threshold in response to determining the one or both of the heating system and the cooling system are in the recovery mode.

8. The thermostat of claim 7, wherein the processor is configured to:
determine whether the rate of change of the differences between the sensed temperature and the setpoint temperature is less than the second threshold;
determine whether a predetermined amount of time has elapsed since determining the rate of change of the differences between the sensed temperature and the setpoint temperature is less than the second threshold; and
determine when the loss of comfort control exists based on whether the predetermined amount of time has elapsed.

9. A mechanism for determining a loss of comfort control by a heating, ventilation, and air conditioning (HVAC) system, the mechanism comprising:
a processor configured to connect to one or both of a heating system and a cooling system;
wherein the processor is configured to:
receive a sensed temperature value;
receive a setpoint temperature for the one or both of the heating system and the cooling system;
control the one or both of the heating system and the cooling system to achieve the setpoint temperature;
determine proportional errors over time, the proportional error is a difference between the sensed temperature value and the setpoint temperature;
compare the proportional errors determined over time to a proportional error threshold value;
in response to determining a proportional error of the proportional errors determined over time goes beyond the proportional error threshold value, determine a rate of change of the proportional errors determined over time; and
determine a loss of comfort control exists based on the rate of change of the proportional errors during a time when the one or both of the heating system and the cooling system is not in a recovery mode.

10. The mechanism of claim 9, wherein the processor is configured to compare the rate of change of the proportional errors to a first rate of change threshold value.

11. The mechanism of claim 10, wherein the processor is configured to:
in response to determining the rate of change of the proportional error is less than the first rate of change threshold value, determine whether the HVAC system is in the recovery mode; and
in response to determining the HVAC system is in the recovery mode, determine whether the rate of change of the proportional error is less than a second rate of change threshold.

12. The mechanism of claim 11, wherein the recovery mode is a mode in which the HVAC system is recovering from one or both of a mode change and a setpoint change.

13. The mechanism of claim 11, wherein the processor is configured to:
in response to determining the rate of change of the proportional error is less than the second rate of change threshold value, determine whether the proportional error has been less than the second rate of change threshold value for more than a predetermined amount of time; and
when the rate of change of the proportional error has been less than the second rate of change threshold value for more than the predetermined amount of time, set an alert indicating a loss of space comfort control by the HVAC system.

14. The mechanism of claim 9, wherein the processor is configured to remove noise from the proportional error by applying a filter to the rate of change of the proportional error.

15. A method for determining when a heating, ventilation, and air conditioning (HVAC) system has lost comfort control, the method comprising:
controlling the HVAC system to achieve a setpoint temperature at a temperature sensor in an area at which the HVAC system is configured to control comfort;
determining a rate of change over time of proportional errors associated with the HVAC system, the proportional error is a difference between a sensed temperature in the area at which the HVAC system is configured to control comfort and the setpoint temperature of the HVAC system;
determining a loss of comfort control exists based at least in part on the rate of change of the proportional errors and a first rate of change threshold during a time when the HVAC system is not in a recovery mode; and
determining a loss of comfort control exists based at least in part on the rate of change of the proportional errors and a second rate of change threshold during a time when the HVAC system is in a recovery mode.

16. The method of claim 15, the method further comprising comparing the rate of change of the proportional errors to a first threshold value.

17. The method of claim 16, the method further comprising:
in response to determining rate of change of the proportional errors is less than the first threshold value, determining whether the HVAC system is in the recovery mode; and
in response to determining the HVAC system is in the recover mode, determining whether the rate of change of the proportional errors is less than a second threshold value.

18. The method of claim 17, the method further comprising:
- in response to determining the rate of change of the proportional errors is less than the second threshold value, determining whether the rate of change of the proportional errors has been less than the second threshold value for more than a predetermined amount of time; and
- when the rate of change of the proportional errors has been less than the second threshold value for more than the predetermined amount of time, setting an alert indicating a loss of space comfort control by the HVAC system.

* * * * *